(12) United States Patent
Liu et al.

(10) Patent No.: US 10,419,106 B1
(45) Date of Patent: Sep. 17, 2019

(54) SATELLITE-BASED CONTENT DELIVERY NETWORK (CDN) IN AN EXTRATERRESTRIAL ENVIRONMENT

(71) Applicant: Amazon Technologies, Inc., Seattle, WA (US)

(72) Inventors: Jungtao Liu, Saratoga, CA (US); Jin Dong Kim, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/965,445

(22) Filed: Apr. 27, 2018

Related U.S. Application Data

(60) Provisional application No. 62/566,136, filed on Sep. 29, 2017.

(51) Int. Cl.
  *H04B 7/185* (2006.01)
  *H04L 29/08* (2006.01)
  *H04L 29/06* (2006.01)

(52) U.S. Cl.
  CPC ..... *H04B 7/18513* (2013.01); *H04B 7/18515* (2013.01); *H04L 67/06* (2013.01); *H04L 67/104* (2013.01); *H04L 67/2842* (2013.01); *H04L 65/4084* (2013.01)

(58) Field of Classification Search
  CPC ... H04L 67/2842; H04L 67/104; H04L 67/06; H04L 65/4084; H04B 7/18517; H04B 7/18504; H04B 7/18513; H04B 7/18515; H04B 7/18578; H04B 7/18582
  See application file for complete search history.

(56) References Cited

PUBLICATIONS

Internet World Status Usage and Population Statistics http://www.internetworldstats.com/stats.htm, retrieved Jul. 10, 2019.
Arwent Armbrecht, "4 reasons 4 billion people are still offline", Feb. 23, 2016, https://www.weforum.org/agenda/2016/02/4-reasons-4-billion-people-are-still-offline/.
Global Internet usage, https://en.wikipedia.org/wiki/Global_Internet_usage, retrieved Jul. 10, 2019.

(Continued)

*Primary Examiner* — Dady Chery
(74) *Attorney, Agent, or Firm* — Lowenstein Sandler LLP

(57) ABSTRACT

Technology for satellite-based content delivery network (CDN) is described. The satellite-based CDN uses a network architecture to provide global high-speed Internet service from above the sky through various aircrafts such as high-altitude airships, satellites, space stations, and eventually the lunar data centers by taking into consideration of the technology advancements in the RF and optical wireless communications. The satellite-based CDN provides content delivery over data networks, aviation, data storage, and edge caching. The satellite-based CDN supports both the delay-sensitive traffic such as interactive services, voice calls, and video calls that consume medium to low data bandwidth, and the more delay-tolerant but high bandwidth Internet content items such as streaming and background services (e.g. email, FTP). The satellite-based CDN can also support highly time sensitive applications that require near real-time responses such as professional gaming in selected areas covered by the high-altitude airships.

20 Claims, 13 Drawing Sheets

(56) References Cited

PUBLICATIONS

Mikal Khoso, "How Much Data is Produced Every Day?" May 13, 2016, https://www.northeastern.edu/levelblog/2016/05/13/how-much-data-produced-every-day/.

VNI Forecast Highlights Tool, https://www.cisco.com/c/m/en_us/solutions/service-provider/vni-forecast-highlights.html, retrieved Jul. 10, 2019.

Juraj Poliak, Dirk Giggenbach, Florian Moll, "Terabit-throughput GEO satellite optical feeder link testbed", 2015 13th International Conference on Telecommunications (ConGTEL), Date of Conference: Jul. 13-15, 2015.

Iridium Satellite Data Services White Paper, Version 1.0 Jun. 2, 2003.

Eternal 5D data storage could reliably record the history of humankind, Digital documents stored in nanostructured dots in fused quartz crystal for billions of years could survive the end of the human race, Feb. 16, 2016, https://www.kurzweilai.net/eternal-5d-data-storage-could-reliably-record-the-history-of-humankind.

Tim Youngblood "5D Data Storage: How Does it Work and When Can We Use it?" Feb. 20, 2016, https://www.allaboutcircuits.com/news/5d-data-storage-how-does-it-work-and-when-can-we-use-it/.

Kevin Huebler, special to CNBC.com, "Superman memory crystal lets you store 360TB worth of data" Feb. 20, 2016. https://www.cnbc.com/2016/02/20/superman-memory-crystal-lets-you-store-360tb-worth-of-data.html.

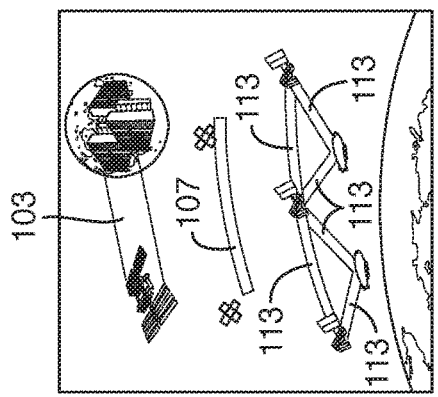
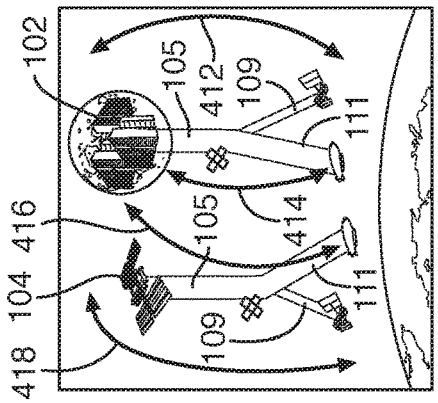
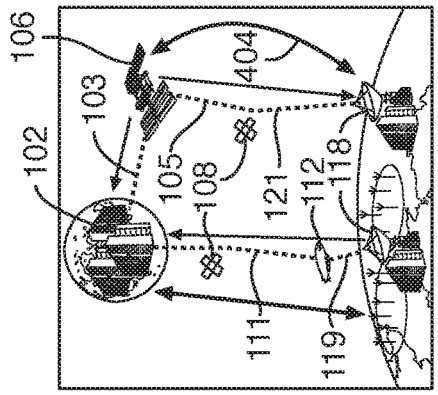
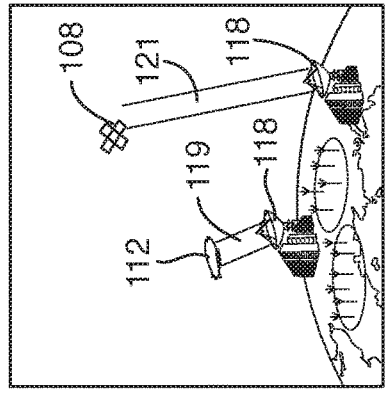
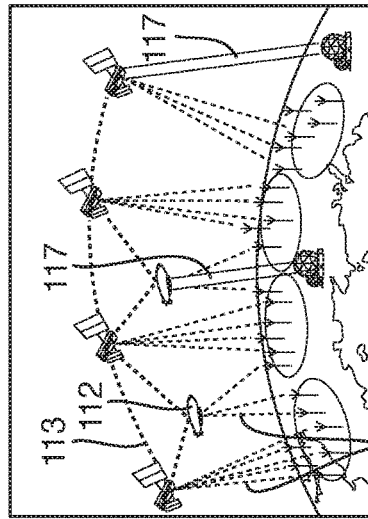
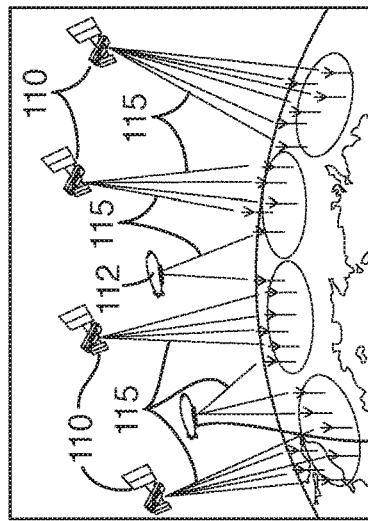

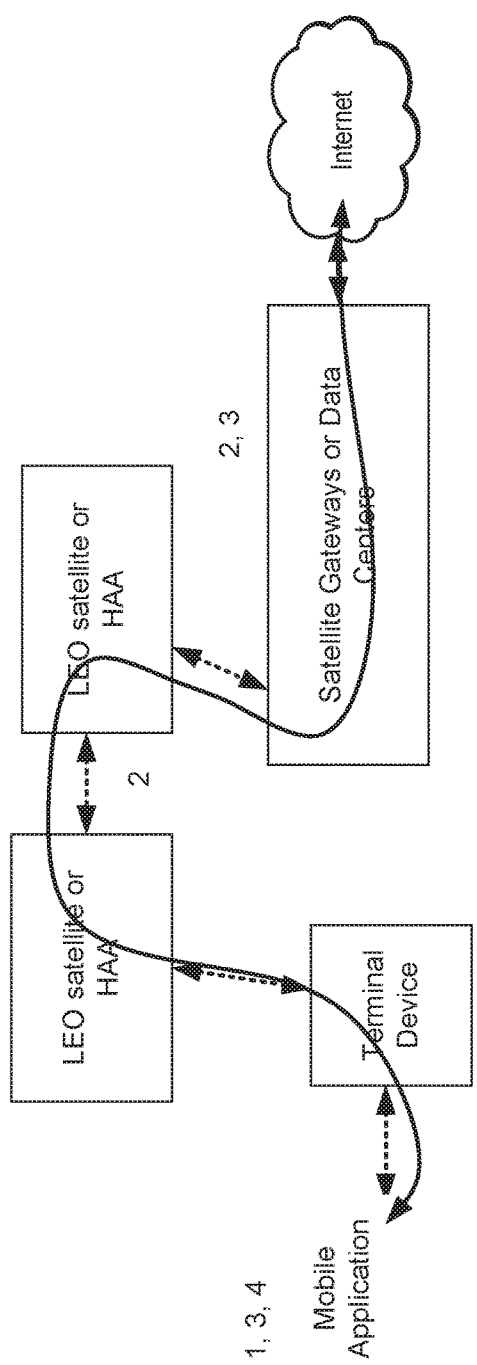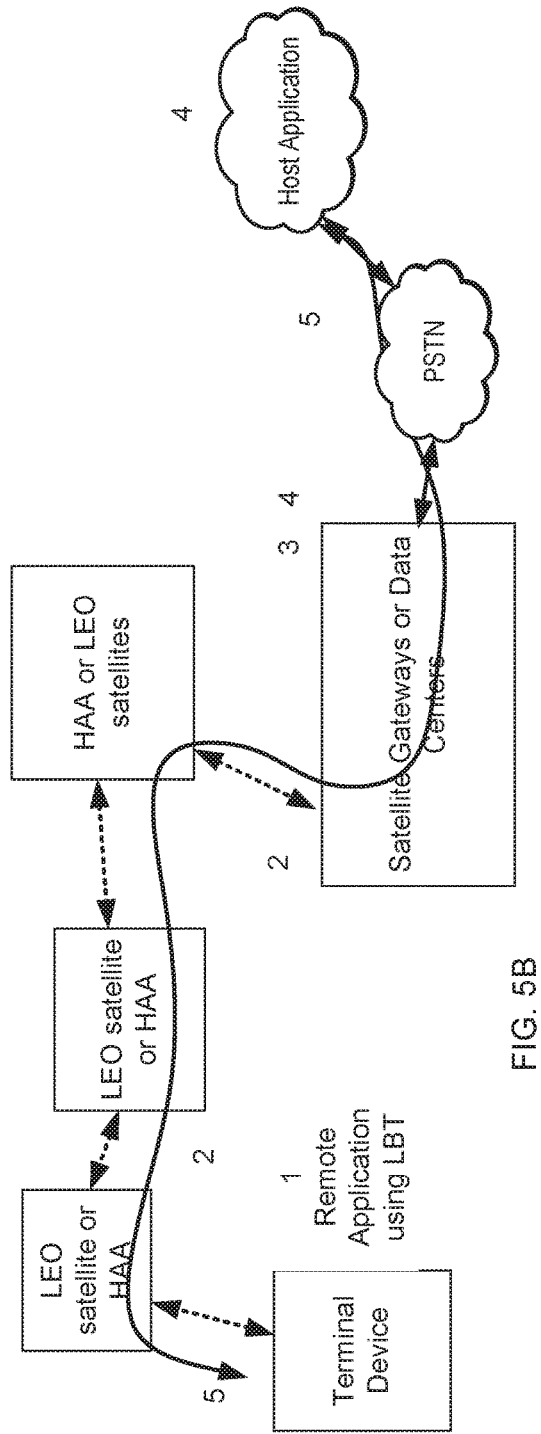
FIG. 5A
FIG. 5B

SATELLITE-BASED CONTENT DELIVERY NETWORK (CDN) IN AN EXTRATERRESTRIAL ENVIRONMENT

RELATED APPLICATIONS

This application claims the priority of U.S. Application No. 62/566,136, filed Sep. 29, 2017, the entire contents of which are incorporate by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4A illustrates an inter-layer communication link between a ground station and a HAA and an inter-layer communication link between a ground station and a GEO satellite according to one embodiment.

FIG. 4B illustrates a first path of three inter-layer communication links between a ground station and a space-based data-center on the moon and a second path of two inter-layer communication links and an intra-layer communication link between a ground station and the space-based data-center on the moon according to one embodiment.

FIG. 4C illustrates multiple paths between LEO satellites and HAAs and a space-based data-center on the moon according to one embodiment.

FIG. 4D illustrates ISLs between devices in an access layer, a caching layer, and a storage layer according to one embodiment.

FIG. 4E illustrates a space-based data-center feeding multiple GEO/medium earth orbit (MEO) satellites over multiple inter-layer communication links and a space-based data-center feeding multiple GEO/MEO satellites in the caching layer over multiple inter-layer communication links according to one embodiment.

FIG. 4F illustrates four LEO satellites and two HAAs to provide an access layer to multiple regions, each region having multiple terminal devices according to one embodiment.

FIG. 4G illustrates an access layer comprising multiple LEO satellites and multiple HAAs and ground stations to feed content into the access layer according to one embodiment.

FIG. 5A illustrates a flow for a circuit-switched voice call through a gateway station of a satellite network according to one embodiment.

FIG. 5B illustrates a flow for a data call through a gateway station of a satellite network according to one embodiment.

DETAILED DESCRIPTION

Figure 1A:
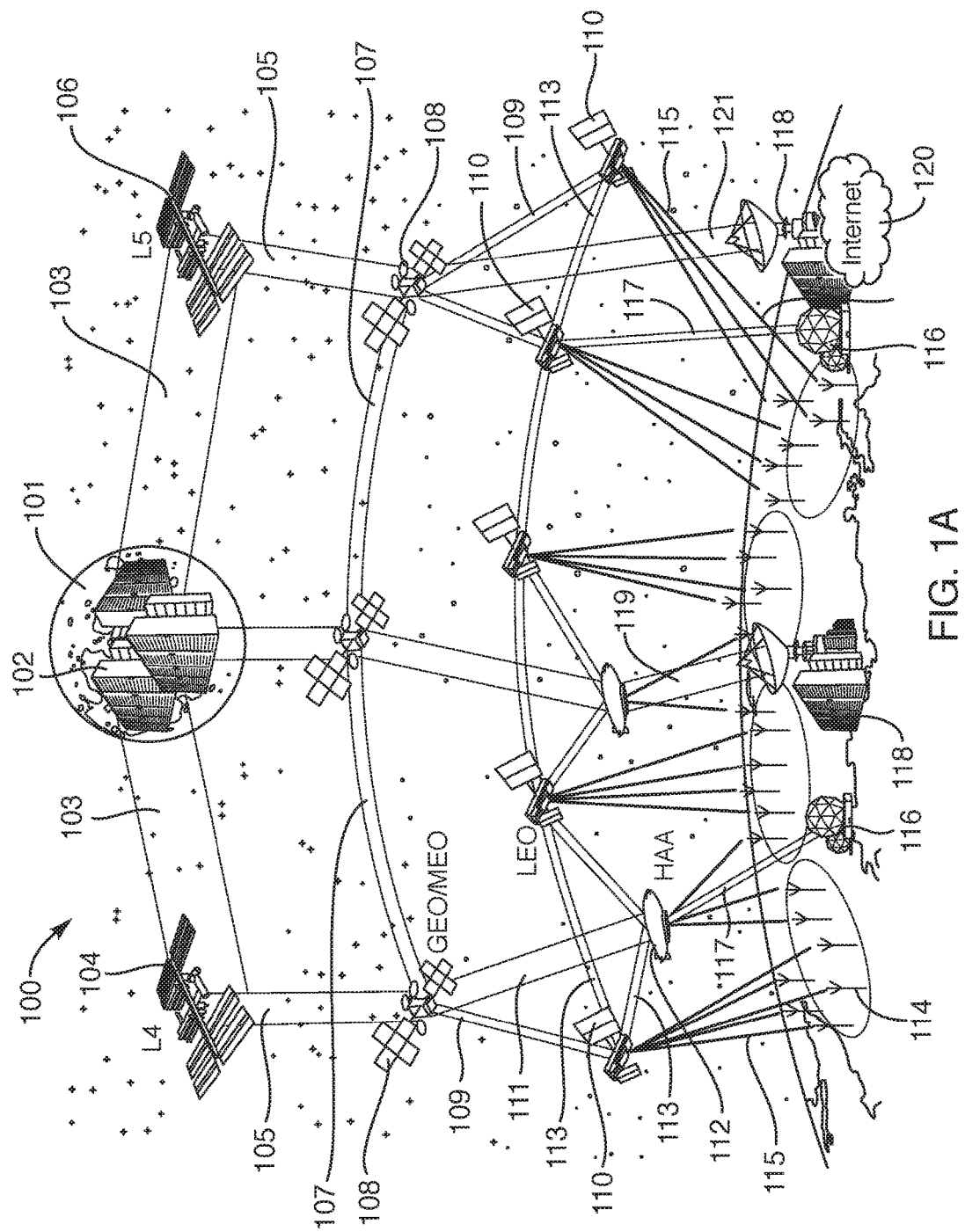
FIG. 1A is a diagram illustrating an extraterrestrial environment for a satellite-based content delivery network (CDN) of devices according to one embodiment.

In 2018, about 60% of the world population has no Internet connection as described and shown in IPv4 address usage maps. Approximately 70% of the Internet traffic today is video content. It is projected to reach 80% by 2020. To improve the latency of video content, most content items are cached at a network edge for faster access. The benefit of edge caching and edge processing is the reduced Internet backbone traffic and the shorter distances (in the number of hop counts) between the content items and the terminal devices (also referred to as end devices, end-user devices, user devices, client devices, or the like). The total amount of data in the world will likely reach 44 zettabytes by 2020. Each day, as much as 2.5 exabytes are produced. For example, in order to transport all the data generated daily, an aggregated 30 TBps (a.k.a. 240 Tbps) link is needed.

Existing satellite data and voice service providers operate exclusively in one type of orbit, mostly GEO or LEO. For example, one conventional GEO satellite that is used for broadband Internet access, such as the EchoStar 19 designed by SSL (Space System Loral), can do 138 spot-beams in Ka band, weighs 6,640 kg with a throughput of 220 Gbps per satellite. Other similar GEO satellites, such as the ViaSat-2, offer a comparable 300 Gbps throughput. In contrast, the latest LEO satellite from Iridium NEXT weights 860 kg and features 48 spot-beams. Each spot beam covers roughly 250 miles in diameter on the earth. One of the major challenges to the existing satellite network is the limited bandwidth, especially on the uplink from the Earth station. Internet traffic is asymmetric with heavy traffic on the downlink.

Content items are fetched from the ground station through the uplink, and then forwarded to the terminal devices through the satellite downlink. Unlike the broadcast service, Internet traffic provides little opportunity for bandwidth sharing using multicast. All the above exacerbates the uplink bandwidth limitation in conventional satellite-based systems.

Described herein are technologies for satellite-based content delivery network (CDN) using an extraterrestrial cloud hosted environment. The embodiments describe herein of a satellite-based CDN residing above the Earth ground may use 1) the HAA and LEO satellites as the access layer 206 to communicate either upward with the caching layer 204 or downward with the traditional satellite ground stations, 2) the GEO/MEO satellites as the caching layer 204 to perform edge caching for the access layer 206 while communicating with the uplink feed station from the Earth for massive data upload according to the selected caching strategy and forwarding the data to the storage layer 202 during the cache flush, 3) the space stations located at L4/L5 Lagrange points to serve as the data storage and relay station when the GEO/MEO satellites cannot be reached directly by the lunar data centers, 4) the data centers on the lunar surface to store permanently the massive data uploaded from the Earth. As noted, 70% of the Internet traffics today are video content items which require high bandwidth but have relatively high delay tolerance. By allowing most of the content items to be fetched from the sky, one can significantly reduce the loadings on the communication links between the ground station and the access layer 206, which in turn allow the extra capacities to be allocated to support the more delay sensitive services such as voice and video calls. The satellite-based CDN is designed to meet the requirements of both the delay-sensitive traffic such as interactive services, voice calls, and video calls that consume medium to low data bandwidth, and the more delay-tolerant but high bandwidth Internet content items such as streaming and background services (e.g. email, FTP). It is able to support highly time sensitive applications requiring near real-time responses such as professional gaming in selected areas covered by the high-altitude airships. The proposed phased deployment approach takes advantages of the current technology advancements such as edge caching and high-speed radio frequency (RF) and optical wireless communications to fulfill the requirements of the access and caching layer 204 while working on the remaining of the system through multiple long-term space adventures which may solidify in the coming decades through supports from both the government agencies and the private sectors.

In one embodiment, the satellite-based CDN includes a storage layer, a caching layer, and an access layer. The storage layer may include one or more space-based data-centers positioned at the moon (lunar data-center), at Lagrange point L4, Lagrange point L5, or any combination thereof. The caching layer may include a fleet of GEO satellites, each of the GEO satellites including a first wireless communication subsystem. Alternatively, the caching layer may include one or more MEO satellites. The first wireless communication subsystem of a GEO/MEO satellite may communicate with devices in the storage layer, devices in the access layer, as well as other first wireless communication subsystems on other GEO/MEO satellites. The access layer may include a fleet of low earth orbit (LEO) vehicles, each of the LEO vehicles including a second wireless communication subsystem. The LEO vehicle may be a LEO satellite, a high altitude airship (HAA), or the like. The second wireless communication subsystem of a LEO vehicle may communicate with devices in the caching layer, devices on earth, as well as other second wireless communication subsystems on other LEO vehicles. The first and second wireless communication subsystems may communicate with wireless communication subsystems in lower layers using point-to-multipoint (P2MP) downlinks and may communicate with wireless communication subsystems in higher layers using point-to-point (P2P) uplinks.

Embodiments of the satellite network architecture supports both conventional circuit-switched voice/data and the Internet service with much improved data throughput as compared to conventional satellite-based systems. The network architecture of the embodiments described herein reduce the uplink (ground-to-satellite) Internet traffic by as much as 70% with a mixture of advanced technologies such as load balancing, edge computing, content caching, massive phased array antennas, high bandwidth (optical) inter-satellite links (ISLs) between GEO/Medium earth orbit (MEO)/LEO satellites, etc.

Figure 1B:
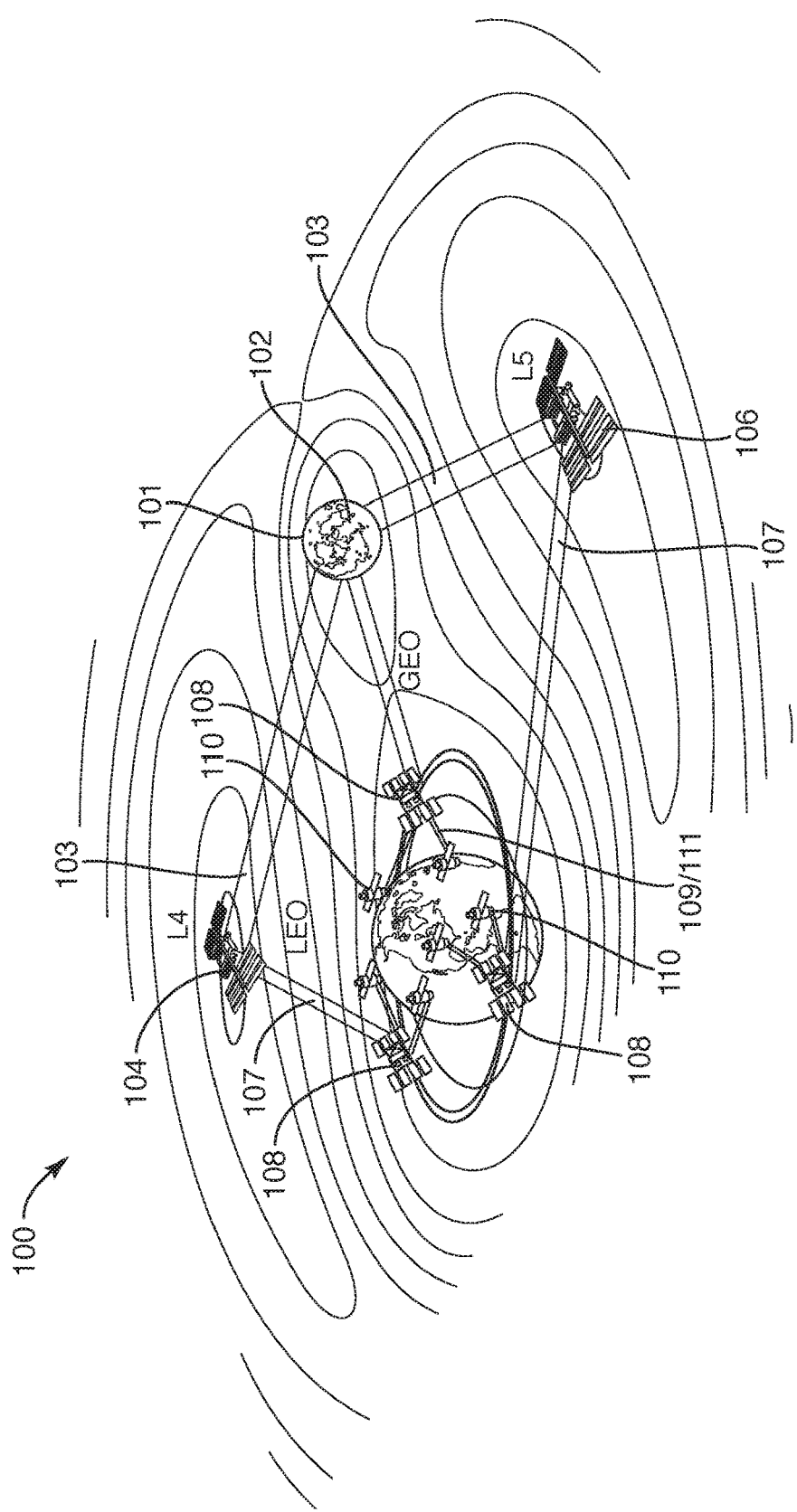
FIG. 1B is a diagram illustrating an alternate view of the satellite-based CDN of FIG. 1A according to one embodiment.

FIG. 1A is a diagram illustrating an extraterrestrial environment for a satellite-based content delivery network (CDN) 100 of devices according to one embodiment. FIG. 1B is a diagram illustrating an alternate view of the satellite-based CDN 100 of FIG. 1A. The satellite-based CDN 100 includes one or more space-based data-centers 102 positioned at the moon 101 (lunar data-center), a space-based data-center 104 at Lagrange point L4, and a space-based data-center 106 at Lagrange point L5. The satellite-based CDN 100 includes a fleet of one or more GEO satellites 108 (or MEO satellites). For ease of description, the GEO and MEO satellites may be referred to as GEO satellites 108 or GEO/MEO satellites 108. The satellite-based CDN 100 may also include a combination of one or more GEO satellites or MEO satellites. The satellite-based CDN 100 includes a fleet of one or more LEO vehicles. The LEO vehicles may be LEO satellites 110 or HAAs 112, as described herein. The HAAs 112 may not actually be in the LEO orbit, but for ease of description, the LEO satellites 110 are referred to as LEO vehicles in the access layer of the satellite-based CDN 100. On the earth, there may multiple terminal devices 114, one or more ground stations 116 that can communicate with the LEO satellites 110 or HAAs 112, and one or more ground stations 118 that can communicate with HAAs 112 or GEO satellites 108. The one or more ground stations 118 may be located at ground-based data centers and may be connected to the Internet 120. Wireless communication subsystems of these various devices can establish communication links with other wireless communication subsystems of other devices in the same layer (referred to herein as intra-layer communication links) or in different layers (referred to herein as inter-layer communication links).

As illustrated in FIG. 1A, a wireless communication subsystem of the space-based data-center 102 positioned at the moon 101 and a wireless communication subsystem of the space-based data-center 104 at Lagrange point L4 can establish one or more intra-layer communication links 103 between the wireless communication subsystems. Similarly, wireless communication subsystems between the space-based data-center 102 and the space-based data-center 106 at Lagrange point L5 can establish one or more intra-layer communication links 103. Using the wireless communication subsystems, inter-layer communication links 105 can be established between space-based data-centers 102, 104, 106 and GEO satellites 108. Intra-layer communication links 107 can be established between GEO satellites 108. Similarly, inter-layer communication links 109 can be established between GEO satellites 108 and LEO satellites 110 and inter-layer communication links 111 between the GEO satellites 108 and HAAs 112. Intra-layer communication links 113 can be established between LEO satellites 110, as well as between LEO satellites 110 and HAAs 112. Inter-layer communication links 115 can be established between the LEO satellites 110 and the terminal devices 114, as well as between HAAs 112 and the terminal devices 114. Inter-layer communication links 117 can be established between HAAs 112 and the ground stations 116. Inter-layer communication links 119 can be established between HAAs 112 and the ground stations 118. Inter-layer communication links 121 can be established between the GEO satellites 108 and the ground stations 118.

The communication links of the satellite-based CDN 100 may provide ultra-high-speed point-to-point uplink data feeding stations from the Earth ground, high-speed relay stations at Lagrange points L4/L5, high-speed point-to-point uplink for inter-layer communications, high-speed point-to-point links between the intra-layer stations, and high-speed spot-beams on the downlink for inter-layer multiple access. The wireless communication subsystems can use massive phase array antennas for downlink multiple access from the terminal devices 114. The low-latency earth ground stations 116, 118, can be used for delay-sensitive applications such as voice and video calls. In some embodiments, the communication links of the satellite-based CDN 100 can use P2P uplinks when a device is communicating with a device in a higher layer and use P2MP downlinks when communicating with a device in a lower layer, as described herein. In some cases, the wireless communication subsystems can use P2P downlinks when communicating with terminal devices to increase the data rate of the communications, as compared to communication with a P2MP downlink.

The satellite network architecture is designed to handle both the bandwidth hungry Internet content items and the lower data rate (but timing sensitive) real-time communications. It should be noted that FIG. 1A does not illustrate the voice communication elements described herein. The satellite network architecture may rely on a few assumptions, 1) data access from the sky is much more efficient than delivering them from Earth's ground stations, 2) 70% of the Internet traffic is related to content that can be pre-stored prior to access, 3) RF and optical communication links above in the space provide much higher bandwidth than the earthbound links, 4) edge caching provides faster data access with moderate memory and storage requirements, 5) mechanism exist for the network to receive and store exabytes of data each day, 6) the network must be able to provide gigabits per second data rate to each terminal devices on the downlink including remote and under-populated areas. Item 3) above is believed to be true as the main channel impairment for the free space optical (FSO) has been the atmospheric turbulence and we expect to see less of that above the GEO orbit, and the spectrum is not regulated in the outer space; hence, more flexibility in selecting the transmit power and the frequency bandwidth.

Figure 2:
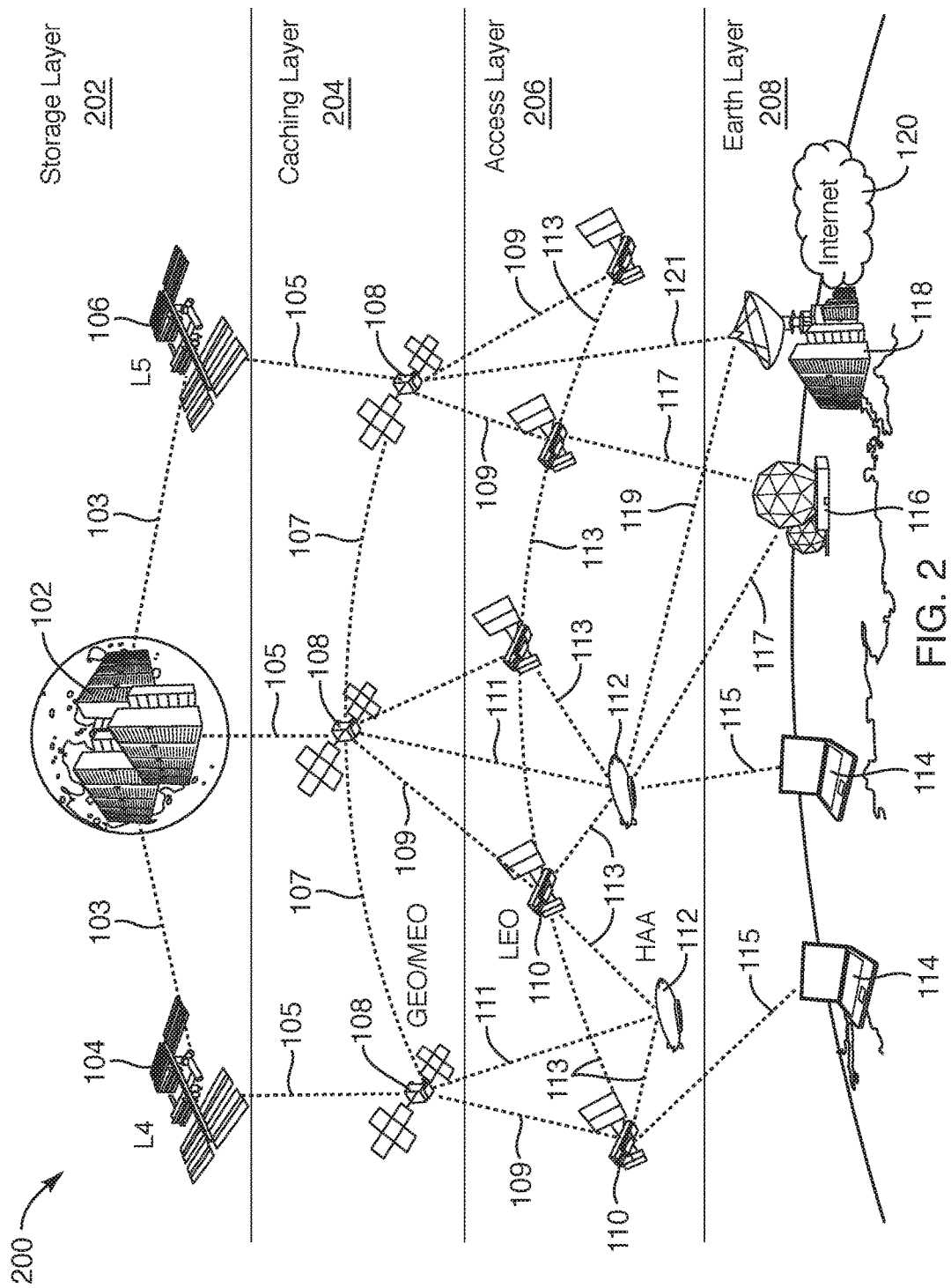
FIG. 2 is a diagram illustrating multiple layers of a satellite-based CDN of device in an extraterrestrial environment according to one embodiment.

FIG. 2 is a diagram illustrating multiple layers of a satellite-based CDN 200 of device in an extraterrestrial environment according to one embodiment. The satellite-based CDN 200 includes four layers: storage layer 202, caching layer 204, access layer 206, and earth ground layer 208. The storage layer 202 includes one or more lunar space-based data-centers 102 positioned at the moon, a space-based data-center 104 positioned at the Lagrange point L4, a space-based data-center 106 positioned at the Lagrange point L5. The caching layer 204 includes a fleet of multiple GEO satellites 108. Although three GEO satellites 108 are illustrated, the caching layer 204 may include one or more GEO satellites, zero or more MEO satellites, or any combination thereof. The access layer 206 includes a fleet of multiple LEO satellites 110, as well as multiple HAAs 112. Although five LEO satellites and two HAAs are illustrated, the access layer 206 may include one or more vehicles in the access layer 206 that may be any number of LEO satellites 110, any number of HAAs 112, or any combination thereof. The earth ground layer 208 includes one or more terminal devices 114, as well as ground stations 116, 118. The ground stations 116, 118 can be used for serving the access layer 206, as well as feeding content items to the upper layers, including the access layer 206 and the caching layer 204.

In the satellite-based CDN 200, the devices in the access layer 206 can form an access network. On top of the access layer 206, the devices in the caching layer 204 can be used for edge caching and computing for the access network of the access layer 206. Above the caching layer 204 is a top layer with unmanned data centers. The unmanned data centers may be colonized on the moon surface. The unmanned data centers can be colonized on the moon surface together with intermediate data storage and relay stations that reside at an earth-lunar Lagrange point. In one embodiment, on the earth ground layer 208, the ground stations 116, 118 can function as uplink feeding stations that directly delivers data to the GEO satellites 108 (or MEO satellites) of the caching layer 204 or to the HAAs 112 for relaying to the caching layer 204. The ground stations 116, 118 can also communication directly with the LEO satellites 110 and the HAAs 112 in the access layer 206 to deliver time-sensitive data to the terminal devices 114. These communications for time-sensitive data, such as for voice services, may be done with current infrastructures used for supporting voice communications over the LEO satellites 110 at the access layer 206. Current infrastructures, however, do not utilize HAAs 112 as additional devices that can communicate time-sensitive data to the terminal devices 114. The embodiments described herein allow the LEO satellites 110 and HAAs 112 for supporting time-sensitive data communications.

FIG. 2 also shows the various communication links established between devices between layers 202-208 and within each of the layers 202-208 of the satellite-based CDN 200. For the sake of convenience, the communication links coming from the moon towards the earth are referred to as "downlinks," whereas the links in the opposite direction are referred to as "uplinks." The communication links between transceivers (also referred to herein as wireless communication subsystems of the devices) within the same layer are referred to as "intra-satellite links" (ISLs). The hierarchical structure has the storage layer 202 (lunar data center or satellite-based data centers) as a top layer of the CDN and the access layer 206 as a bottom layer. The access layer 206 may be considered the distribution layer to terminal devices on the earth ground layer 208.

Although the satellite-based CDN 200 illustrated in FIG. 2 shows three layers above the earth ground layer 208, in other embodiments, the satellite-based CDN may include the access layer 206 and the caching layer 204. For example, the satellite-based CDN with the access layer 206 and the caching layer 204 can be used without extraterrestrial data centers. However, as new technologies become accessible for extraterrestrial data centers, the storage layer 202 can be added to provide a true global Internet coverage to terminal devices 114 in the earth ground layer 208. It should be noted that the terminal devices 114 can be airborne, on the sea, on the earth's surface, or structures on the earth's surface. That is, the earth ground layer 208 is not limited to terminal devices 114 that are physically located on the earth's surface, but any altitude lower than the LEO satellites 110 and the HAAs 112. Also, in another embodiment, the lunar space-based data-centers 102 can be considered the storage layer 202 and the satellite-based space-based data-centers 104, 106 may be considered a relay layer between the storage layer 202 and the caching layer 204. In that case, the satellite-based CDN 200 may include three layers (storage, caching, and access) or four layers (storage, relaying, caching, and access). For example, the Lagrange point (L4 and L5) space stations can mainly function as a store and forward relay station due to the size limitation of the space station, whereas The lunar data centers may function as the main data storage facilities which should be provisioned to hold as much data as possible with high-speed links (e.g., in the order of terabytes per second). In order to simplify the satellite communication subsystem in one embodiment, for any given satellite in any layer, the uplink can be a point-to-point (P2P) link with the highest data rate attainable, while the downlink can be a point-to-multipoint (P2MP) link with rates lower than the uplink. The ISLs can be P2P as well.

Details of the functions of each of the layers in the satellite-based CDN 200 and how the layers interact and the wireless communication subsystems of the devices in these layers are described below. Also described below are some details regarding link budget analyses and potential enabling technologies that can be used for the satellite-based CDN 200. For example, each node in a layer may be a certain type of electronic device with a wireless communication subsystem that is capable of wirelessly communicating with other devices in the same layer, as well as devices in other layers. In some cases, these electronic devices can be payloads of a satellite. In other cases, the electronic devices can be placed in a vehicle, such as the HAAs 112. HAAs 112 may carry additional computing and storage resources than a payload of the LEO satellites 110. Like the LEO satellites 110, the HAAs 112 can serve as part of the access layer 206, but also serve content up to the caching layer 204 using the additional computing and storage resources. The types of nodes (or components) in the satellite-based CDN 200 may include HAA, LEO/MEO/GEO satellites, L4/L5 Lagrange Space Stations, Earth and Lunar data centers, Earth/Moon Ground stations. These nodes collectively fulfill several roles and functionalities within the satellite-based CDN 200. In terms of communication links, the satellite-based CDN 200 may include ultra-high-speed point-to-point uplink data feeding stations, such as the HAAs 112 or the LEO satellites 110 or the GEO satellites 108, from the Earth ground layer 208. The satellite-based CDN 200 may include high-speed relay stations, high-speed P2P uplink for inter-layer communications, high-speed P2P links between the intra-layer stations, and high-speed spot-beams on the downlink for inter-layer multiple access. In some embodiments, massive phased arrays for downlink multiple access for the terminal devices 114 on the earth ground layer 208. As described herein, the earth ground stations can accommodate low-latency communications for delay-sensitive applications, such as voice and video calls.

The satellite-based CDN 200 can have different storage capacities at the different layers. For example, in terms of storage capacity in ascending order, the access layer 206 can have a storage capacity for caching content items at a factor of 1×, the caching layer 204 can have a storage capacity for caching content items at a factor of 10× to 100×, the store and forward relay storage in the storage layer 202 can have a storage capacity for caching content items at a factor of 1,000×, and the data center in the storage layer 202 can have a storage capacity for caching content items at a factor of 1,000,000×. Alternatively, other factors may be used at each of the layers.

Although not illustrated in FIG. 2, each of the space-based data-centers in the storage layer 202 may include a first wireless communication subsystem. The first wireless communication subsystem of the space-based data-centers may communicate with other wireless communication subsystems in other devices in the storage layer 202, as well as wireless communication subsystems in other devices in the caching layer 204. Each of the GEO/MEO satellites in the caching layer 204 may include a second wireless communication subsystem. The second wireless communication subsystem can communicate with other devices in the caching layer 204, as well as the first wireless subsystems in the storage layer 202, as well as wireless communication subsystems in other devices in the access layer 206. Each of the LEO satellites 110 and the HAAs 112 in the access layer 206 include a third wireless communication subsystem. The third wireless communication subsystem of the LEO satellites 110 and the HAAs 112 may communicate with devices in the caching layer 204, terminal devices 114 on earth, as well as other third wireless communication subsystems on other vehicles in the access layer 206. The first, second, and third wireless communication subsystems may communicate with wireless communication subsystems in lower layers using P2MP downlinks and may communicate with wireless communication subsystems in higher layers using P2P uplinks.

Figure 3A:
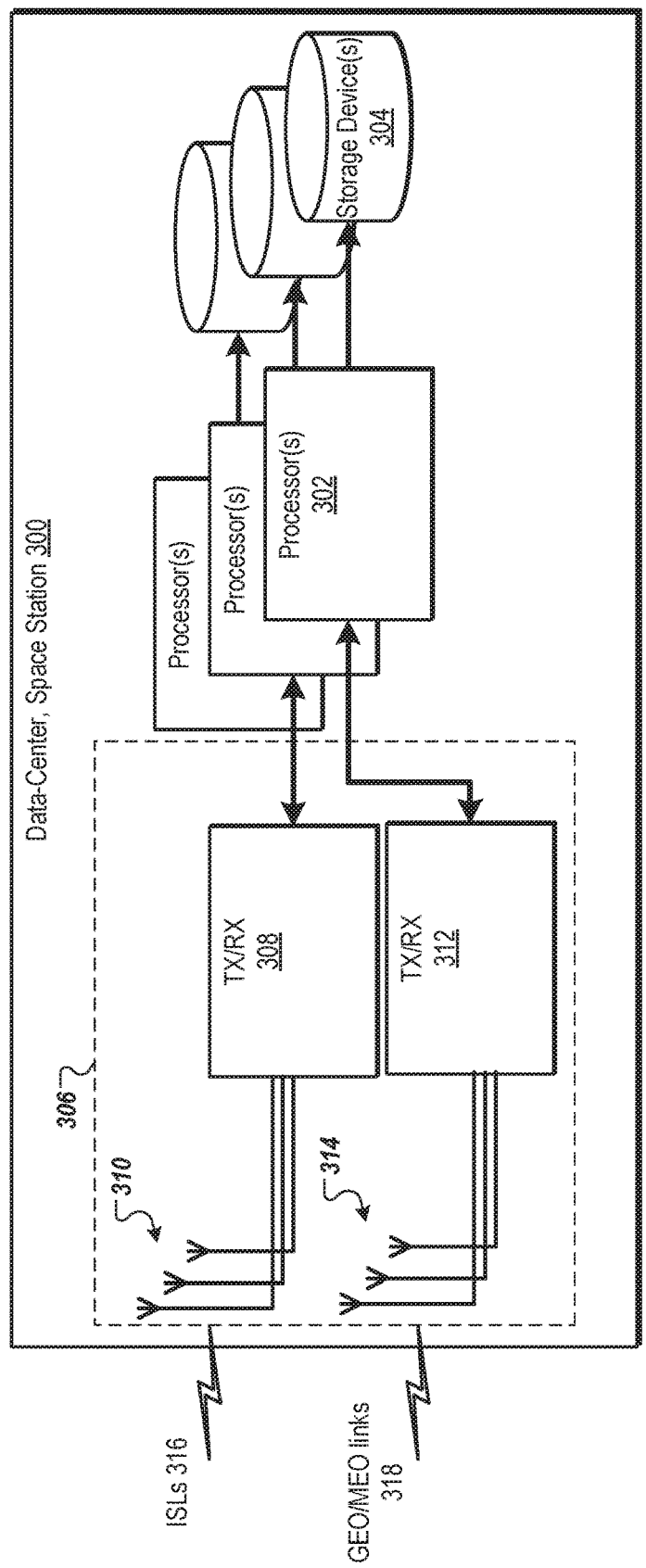
FIG. 3A is a block diagram of a space-based data-center in a storage layer of a satellite-based CDN according to one embodiment.

FIG. 3A is a block diagram of a space-based data-center 300 in a storage layer 202 of a satellite-based CDN according to one embodiment. The space-based data-center 300 includes one or more processors 302, one or more storage devices 304, and a first wireless communication subsystem 306. The first wireless communication subsystem 306 includes a first set of one or more transceivers 308 coupled to the processor(s) 302 and a second set of one or more transceivers 312 coupled to the processor(s) 302. The first set of one or more transceivers 308 is coupled to one or more antennas 310. For example, each of the first set of transceivers 308 is coupled to each one of the antennas 310. In another example, each of the first set of one or more transceivers 308 can be coupled to multiple antennas 310, such as a phased array antenna with multiple antenna elements. The first wireless communication subsystem 306 may include additional switching circuitry to connect the first set of transceivers 308 to the one or more antennas 310. The second set of one or more transceivers 312 is coupled to one or more antennas 314. Similarly, each of the second set of transceivers 312 can be coupled to any combination of one or more of the antennas 314. The first set of transceivers 308 and the antennas 310 can be used to communicate over ISLs 316 between the space-based data-center 300 and another device in the storage layer 202. The second set of transceivers 312 and the antennas 314 can be used to communicate over downlinks (GEO/MEO links 318) between the space-based data-center 300 and another wireless communication subsystem of a device in the caching layer, such as a GEO/MEO satellite. The downlinks can be P2MP links. The storage devices 304 can store one or more content items. The storage devices 304 may contribute to a storage capacity of 1,000,000× of the storage layer 202, where X is the storage capacity of the access layer 206.

In one embodiment, the transceivers of the first set of transceivers 308 are optical transceivers that establish optical communication links for the ISLs and the transceivers of the second set of transceivers 312 are radio frequency (RF) transceivers (e.g., radios) that establish RF communication links for the downlinks. In another embodiment, the transceivers of both the first set of transceivers 308 and the second set of transceivers 312 are optical transceivers. Alternatively, the transceivers of both the first set of transceivers 308 and the second set of transceivers 312 RF transceivers.

Figure 3B:
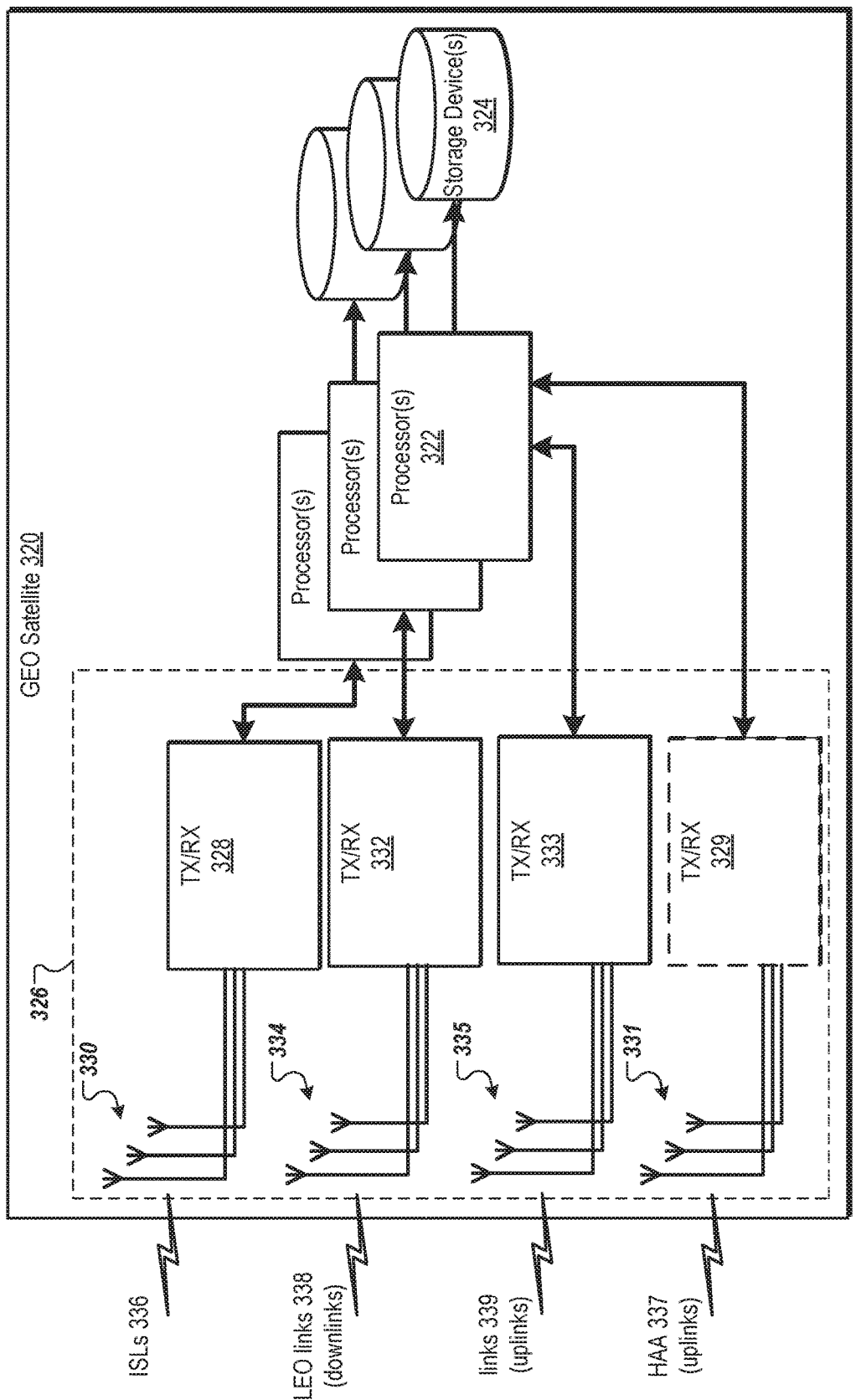
FIG. 3B is a block diagram of a geosynchronous equatorial orbit (GEO) satellite in a caching layer of a satellite-based CDN according to one embodiment.

FIG. 3B is a block diagram of a GEO satellite 320 in a caching layer 204 of a satellite-based CDN according to one embodiment. The GEO satellite 320 includes one or more processors 322, one or more storage devices 324, and a second wireless communication subsystem 326. The second wireless communication subsystem 326 includes a first set of one or more transceivers 328 coupled to the processor(s) 322, a second set of one or more transceivers 332 coupled to the processor(s) 322, and a third set of one or more transceivers 333. The first set of one or more transceivers 328 is coupled to one or more antennas 330. For example, each of the first set of transceivers 328 is coupled to each one of the antennas 330. In another example, each of the first set of one or more transceivers 328 can be coupled to multiple antennas 330, such as a phased array antenna with multiple antenna elements. The second wireless communication subsystem 326 may include additional switching circuitry to connect the first set of transceivers 328 to the one or more antennas 330. The second set of one or more transceivers 332 is coupled to one or more antennas 334. Similarly, each of the second set of transceivers 332 can be coupled to any combination of one or more of the antennas 334. The third set of one or more transceivers 333 is coupled to one or more antennas 334. Similarly, each of the third set of transceivers 333 can be coupled to any combination of one or more of the antennas 335. The first set of transceivers 328 and the antennas 330 can be used to communicate over ISLs 336 between the GEO satellite 320 and another device in the caching layer 204. The second set of transceivers 332 and the antennas 334 can be used to communicate over downlinks (LEO links 338) between the GEO satellite 320 and another wireless communication subsystem of a device in the access layer, such as a LEO satellite or a HAA. The downlinks can be P2MP links. The third set of transceivers 333 and the antennas 335 can be used to communicate over uplinks (links 339) between the GEO satellite 320 and another wireless communication subsystem of a device in the storage layer 202, such as a space-based data-center (lunar data center or space stations positioned at the Lagrange L4/L5 points. The uplinks can be P2P links. The storage devices 324 can store one or more content items. The storage devices 324 may contribute to a storage capacity of 1,000× of the caching layer 204, where X is the storage capacity of the access layer.

In another embodiment, the second wireless communication subsystem 326 further includes a fourth set of one or more transceivers 329 coupled to the processor(s) 322 and one or more antennas 331. The fourth set of transceivers 329 and the antennas 331 can be used to communicate over HAA links 337 (uplinks) between the GEO satellite 320 and HAAs 112 in the access layer 206. Alternatively, these HAA links 337 can be established by the second set of transceivers 332 with the LEO links 338.

In one embodiment, the transceivers of the first set of transceivers 328 and the third set of transceivers 333 are optical transceivers that establish optical communication links for the ISLs and uplinks and the second set of transceivers 332 are RF transceivers that establish RF communication links for the downlinks. In another embodiment, the transceivers of all three of the first set, second set, and third set are optical transceivers. Alternatively, the transceivers of all three of the first set, second set, and third set are RF transceivers.

In another embodiment, a GEO satellite in a first obit includes a storage device and a processor coupled to the storage device. The GEO satellite also includes an intra-satellite wireless interface comprising a first transceiver coupled to the processor, an uplink wireless interface comprising a third transceiver coupled to the processor, and a downlink wireless interface comprising a fifth transceiver coupled to the processor. The processor establishes a first P2P link between the first transceiver and a second transceiver of a second GEO satellite, a second P2P link between the second transceiver and a fourth transceiver of a space-based data-center located in a second orbit that is higher than the first orbit, and a third P2P uplink and a P2MP downlink between the third transceiver and a sixth transceiver of a first device (access layer device) situated in a third orbit that is lower than the first orbit. The processor receives a request for a content item from the first device in the third orbit. The processor requests the content item from the second GEO satellite via the first P2P link when the storage device does not store the content item. The processor requests the content item from the space-based data-center when the storage device does not store the content item and the second GEO satellite does not store the content item. The processor delivers the content item to the access layer device via the P2MP downlink in response to the request. This content item may be 1) stored in the storage device; 2) retrieved from the second GEO satellite via the first P2P link; or 3) retrieved from the space-based data-center via the second P2P link. In one embodiment, the access layer device is a LEO satellite or a HAA.

In one embodiment, the storage device is configured to cache the content item after being received from the second GEO satellite via the first P2P link or from the space-based data-center via the second P2P link. The space-based data-center can be a lunar data center located on the moon or a satellite located at a Lagrange point.

In some embodiments, the transceivers can be optical transceivers, RF transceivers, or any combination thereof. In one embodiment, the first transceiver is an optical transceiver and the first P2P link is a wireless optical link between the first transceiver and the transceiver of the second GEO satellite. The optical transceiver communicates the content item via the wireless optical link. In another embodiment, the second transceiver is an optical transceiver and the second P2P link is a wireless optical link between the second transceiver and the transceiver of the space-based data-center. The optical transceiver communicates the content item via the wireless optical link. In another embodiment, the third transceiver is a RF transceiver and the P2MP downlink is an RF link between the third transceiver and the transceiver of the access layer device. The RF transceiver is to communicate the content item via the RF link. Alternatively, the third transceiver is an optical transceiver. In one embodiment, the first transceiver, the second transceiver, and the third transceiver communicate content data over the respective links at approximately 27 GHz. Alternatively, other combinations of similar or dissimilar frequencies can be used by the transceivers.

In a further embodiment, the first transceiver (or a separate transceiver) establishes a third P2P link between the first transceiver and a transceiver of a MEO satellite. The processor can request the content item from the MEO satellite via the third P2P link when the storage device does not store the content item.

In another embodiment, the downlink wireless interface includes a fourth transceiver coupled to the processor. The processor establishes a fourth P2P uplink between the fourth transceiver and a transceiver of a HAA. The processor can receive content items from the HAA via the fourth P2P uplink for caching the content items in the storage device. In another embodiment, the downlink wireless interface includes a fourth (or fifth) transceiver coupled to the processor. The processor establishes a fourth P2P uplink between the fourth transceiver and a transceiver of a ground station. The processor can receive content items from the ground station via the fourth P2P uplink for caching the content items in the storage device.

Figure 3C:
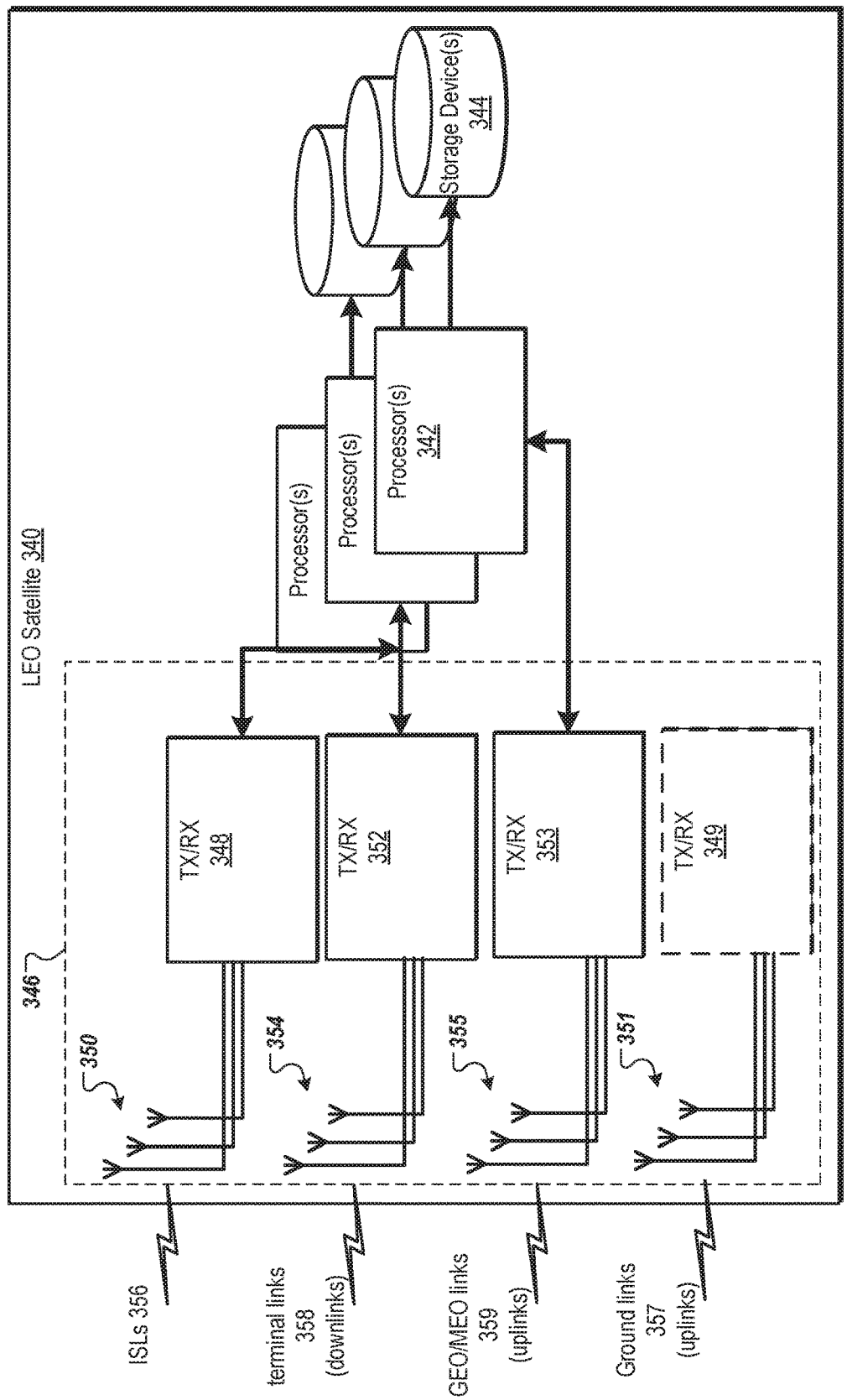
FIG. 3C is a block diagram of a LEO satellite in an access layer of a satellite-based CDN according to one embodiment.

FIG. 3C is a block diagram of a LEO satellite 340 in an access layer of a satellite-based CDN according to one embodiment. The LEO satellite 340 includes one or more processors 342, one or more storage devices 344, and a third wireless communication subsystem 346. The third wireless communication subsystem 346 includes a first set of one or more transceivers 348 coupled to the processor(s) 342, a second set of one or more transceivers 352 coupled to the processor(s) 342, and a third set of one or more transceivers 353. The first set of one or more transceivers 348 is coupled to one or more antennas 350. For example, each of the first set of transceivers 348 is coupled to each one of the antennas 350. In another example, each of the first set of one or more transceivers 348 can be coupled to multiple antennas 350, such as a phased array antenna with multiple antenna elements. The third wireless communication subsystem 346 may include additional switching circuitry to connect the first set of transceivers 348 to the one or more antennas 350. The second set of one or more transceivers 352 is coupled to one or more antennas 354. Similarly, each of the second set of transceivers 352 can be coupled to any combination of one or more of the antennas 354. The third set of one or more transceivers 353 is coupled to one or more antennas 354. Similarly, each of the third set of transceivers 353 can be coupled to any combination of one or more of the antennas 355. The first set of transceivers 348 and the antennas 350 can be used to communicate over ISLs 356 between the LEO satellite 340 and another device in the access layer, such as other LEO satellites or HAAs. The second set of transceivers 352 and the antennas 354 can be used to communicate over downlinks (terminal links 358) between the LEO satellite 340 and a terminal device at an earth ground layer 208. The downlinks can be P2MP links. The third set of transceivers 353 and the antennas 355 can be used to communicate over uplinks (GEO/MEO links 359) between the LEO satellite 340 and another wireless communication subsystem of a device in the caching layer 204, such as a GEO/MEO satellite. The uplinks can be P2P links. The storage devices 344 can store one or more content items. The storage devices 344 may contribute to a storage capacity of X for the access layer. As described above, the transceivers can be optical transceivers, RF transceivers, or any combination thereof. However, it should be noted that optical transceivers may experience more interference in the atmosphere in the access layer to earth ground layer 208 communications, as compared to optical communication links between the storage layer 202 and caching layer 204, between the caching layer 204 and access layer, and intra-layer communications links. RF transceivers can be used for these inter-layer communication links between the access layer and the earth ground layer 208. In some embodiments, an optical transceiver can be used to communicate with a data-center ground station.

In another embodiment, the third wireless communication subsystem 346 further includes a fourth set of one or more transceivers 349 coupled to the processor(s) 342 and one or more antennas 351. The fourth set of transceivers 349 and the antennas 351 can be used to communicate over ground links 357 (uplinks) between the LEO satellite 340 and ground stations in the earth ground layer 208. Alternatively, these ground links 357 can be established by the second set of transceivers 352 with the terminal links 358.

In another embodiment, a LEO vehicle for providing access to a satellite-based CDN includes a storage device and a processor coupled to the storage device. The LEO vehicle may be a LEO satellite or an HAA as described herein. The LEO vehicle also includes an intra-satellite wireless interface comprising a first transceiver coupled to the processor, an uplink wireless interface comprising a second transceiver coupled to the processor, and a downlink wireless interface comprising a third transceiver coupled to the processor. The processor establishes a first point-to-point (P2P) link between the first transceiver and a transceiver of a second LEO vehicle, a second P2P link between the second transceiver and a transceiver of a GEO satellite located in a higher orbit than the LEO vehicle, and a third P2P uplink and a P2MP downlink between the third transceiver and a transceiver of the terminal device. The processor receives a request for content from a terminal device located on earth. The processor can request the content from the second LEO vehicle via the first P2P link when the storage device does not store the content. The processor can request the content item from the GEO satellite via the second P2P link when the storage device does not store the content and the second LEO satellite does not store the content. The processor can deliver the content item to the terminal device via the P2MP downlink in response to the request. This content item may be 1) stored in the storage device; 2) retrieved from the second LEO vehicle via the first P2P link; or 3) retrieved from the GEO satellite via the second P2P link. In a further embodiment, the storage device is configured to cache the content item after being received from the second LEO satellite via the first P2P link or from the GEO satellite via the second P2P link.

In some embodiments, the transceivers can be optical transceivers, RF transceivers, or any combination thereof. In one embodiment, the second transceiver is an optical transceiver and the second P2P link is a wireless optical link between the second transceiver and the transceiver of the GEO satellite. The optical transceiver communicates the content item via the wireless optical link. In another embodiment, the third transceiver is a RF transceiver and the P2MP downlink is a RF link between the third transceiver and the transceiver of the terminal device. The RF transceiver communicates the content item via the RF link.

In another embodiment, the downlink wireless interface further includes a fourth transceiver coupled to the processor. The processor establishes a fourth P2P uplink between the fourth transceiver and a transceiver of a ground station. The fourth transceiver can receive data associated with a voice or video call from the ground station via the fourth P2P uplink. The processor can deliver the data associated with the voice or video call to the terminal device via the P2MP downlink or to the second LEO vehicle via the P2P link. In another embodiment, the downlink wireless interface can receive delay-sensitive traffic such as interactive services, voice calls, and video calls that consume medium to low data bandwidth, as well as more delay-tolerant but high bandwidth Internet content, such as streaming and background services (e.g. email, file transfer protocol (FTP)).

Figure 3D:
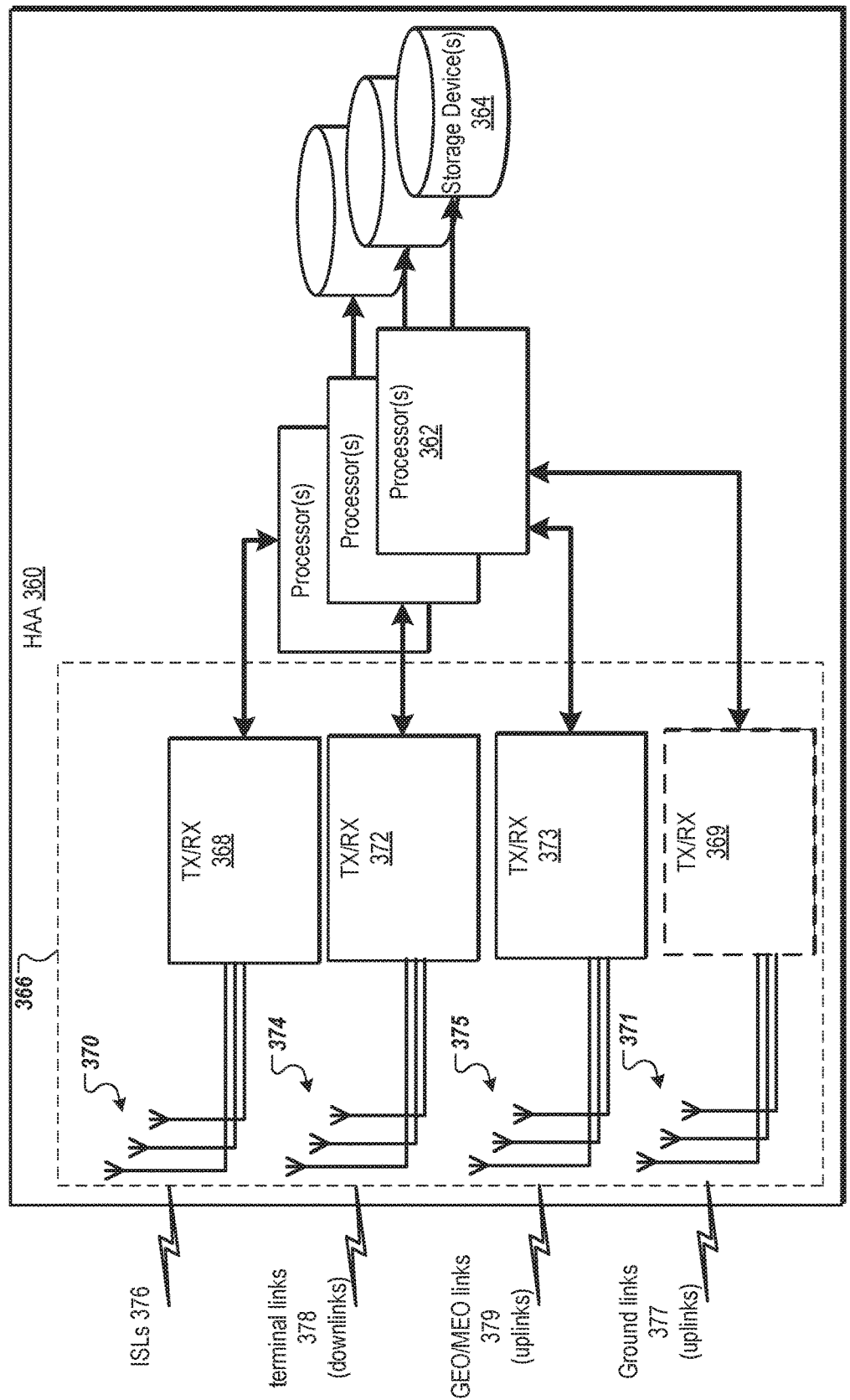
FIG. 3D is a block diagram of a high-altitude airship (HAA) in an access layer of a satellite-based CDN according to one embodiment.

FIG. 3D is a block diagram of a HAA 360 in an access layer of a satellite-based CDN according to one embodiment. The HAA 360 includes one or more processors 362, one or more storage devices 364, and a third wireless communication subsystem 366. The third wireless communication subsystem 366 includes a first set of one or more transceivers 368 coupled to the processor(s) 362, a second set of one or more transceivers 372 coupled to the processor (s) 362, and a third set of one or more transceivers 373. The first set of one or more transceivers 368 is coupled to one or more antennas 370. For example, each of the first set of transceivers 368 is coupled to each one of the antennas 370. In another example, each of the first set of one or more transceivers 368 can be coupled to multiple antennas 370, such as a phased array antenna with multiple antenna elements. The third wireless communication subsystem 366 may include additional switching circuitry to connect the first set of transceivers 368 to the one or more antennas 370. The second set of one or more transceivers 372 is coupled to one or more antennas 374. Similarly, each of the second set of transceivers 357 can be coupled to any combination of one or more of the antennas 374. The third set of one or more transceivers 373 is coupled to one or more antennas 374. Similarly, each of the third set of transceivers 373 can be coupled to any combination of one or more of the antennas 375. The first set of transceivers 368 and the antennas 370 can be used to communicate over ISLs 376 between the HAA 360 and another device in the access layer, such as LEO satellites or other HAAs. The second set of transceivers 372 and the antennas 374 can be used to communicate over downlinks (terminal links 378) between the HAA 360 and a terminal device at an earth ground layer 208. The downlinks can be P2MP links. The third set of transceivers 373 and the antennas 375 can be used to communicate over uplinks (GEO/MEO links 379) between the HAA 360 and another wireless communication subsystem of a device in the caching layer 204, such as a GEO/MEO satellite. The HAAs 360 may include more computational and storage resources than that of the LEO satellites in the access layer. The additional computational and storage resources of the HAAs 360 can be used to provide a higher-data rate uplink to the GEO/MEO satellites in the caching layer 204. The uplinks can be P2P links. The storage devices 364 can store one or more content items. The storage devices 364 may contribute to a storage capacity of X for the access layer.

In another embodiment, the fourth wireless communication subsystem 366 further includes a fourth set of one or more transceivers 369 coupled to the processor(s) 362 and one or more antennas 371. The fourth set of transceivers 369 and the antennas 371 can be used to communicate over ground links 377 (uplinks) between the HAA 360 and ground stations in the earth ground layer 208. Alternatively, these ground links 377 can be established by the second set of transceivers 372 with the terminal links 378. It should also be noted that the HAA 360 can communication with a LEO satellite on the ISLs 376 using the second set of transceivers 372.

As described above, the transceivers can be optical transceivers, RF transceivers, or any combination thereof. However, it should be noted that optical transceivers may experience more interference in the atmosphere in the access layer to earth ground layer 208 communications, as compared to optical communication links between the storage layer 202 and caching layer 204, between the caching layer 204 and access layer, and intra-layer communications links. RF transceivers can be used for these inter-layer communication links between the access layer and the earth ground layer 208.

The transceivers described above in FIGS. 3A-3D can be configured for single channel communications, multi-channel communications, single-input-single-output (SISO) communications, multiple-input-multiple-output (MIMO) communications, beamforming communications such as communications at mm-wave frequencies, or any combination thereof. These transceivers can be part of one or more radios. For example, a radio may include a RF transceiver (e.g., RF frequencies), an mm-wave transceiver (e.g., mm-wave frequencies), or the like. These transceivers can communication via one or more antennas, such as via a phased-array antenna at mm-wave frequencies in the mm-wave frequency spectrum. When communicating over multiple channels according to a channel assignment scheme, the radios can communicate data with a channel bandwidth. A channel is a frequency range with a center frequency and a certain amount of frequency above and below the center frequency, referred to as a channel bandwidth. For example, a channel may have a channel bandwidth, e.g., 20 MHz, 40 MHz, 80 MHz, and 160 MHz. The transceivers may provide a single channel or multiple channels. Multiple RF transceivers, multiple mm-wave transceivers, multiple optical transceivers, or any combination thereof may be used to provide multiple channels.

FIGS. 4A-4G illustrate the inter-layer communication links and intra-layer communication links between each entity.

FIG. 4A illustrates an inter-layer communication link 119 between a ground station 118 and a HAA 112 and an inter-layer communication link 121 between a ground station 118 and a GEO satellite 108 according to one embodiment. The ground stations 118 can be ultra-high-speed point-to-point uplink data feeding stations on the earth ground layer 208.

FIG. 4B illustrates a first path 402 of three inter-layer communication links 119, 111, and 105 between a ground station 118 and a space-based data-center 102 on the moon and a second path 404 of two inter-layer communication links 121, 105 and an intra-layer communication link 103 between a ground station 118 and the space-based data-center 102 on the moon according to one embodiment. The first path 402 includes a first inter-layer communication link 119 between the ground station 118 and the HAA 112, a second inter-layer communication link 111 between the HAA 112 and the GEO satellite 108, and a third inter-layer communication link 105 between the GEO satellite 108 and the space-based data-center 102. The second path 404 includes a first inter-layer communication link 121 between the ground station 118 and the GEO satellite 108, a second inter-layer communication link 105 between the GEO satellite 108 and the space-based data-center 106 at the Lagrange L4/L5 point, and a third intra-layer communication link 103 between the space-based data-center 106 and the space-based data-center 102 on the moon. The space-based data-center 106 can be considered part of a storage and relay layer where the space-based data-center 102 can be considered part of a storage layer 202. The space-based data-center 106 can be a high-speed relay station.

FIG. 4C illustrates multiple paths between LEO satellites 110 and HAAs 112 and a space-based data-center 102 on the moon according to one embodiment. The multiple paths includes a first path 412 of two inter-layer communication links 109, 105 between a LEO satellite 110 and a space-based data-center 102 on the moon, a second path 414 of two inter-layer communication links 111, 105 between a HAA 112 and the space-based data-center 102 on the moon, a third path 416 of two inter-layer communication links 111, 105 and an intra-layer communication link 103 between a HAA 112 and a space-based data-center 102 on the moon, and a fourth path 418 of two inter-layer communication links 109, 105 and an intra-layer communication link 103 between a LEO satellite 110 and a space-based data-center 102 on the moon. In particular, the first path 412 includes a first inter-layer communication link 109 between the LEO satellite 110 and a GEO satellite 108 and a second inter-layer communication link 105 between the GEO satellite 108 and the space-based data-center 102 on the moon. The second path 414 includes a first inter-layer communication link 111 between the HAA 112 and a GEO satellite 108 and a second inter-layer communication link 105 between the GEO satellite 108 and the space-based data-center 102 on the moon. The third path 416 includes a first inter-layer communication link 111 between the HAA 112 and a GEO satellite 108, a second inter-layer communication link 105 between the GEO satellite 108 and the space-based data-center 104 positioned at a Lagrange point, and a third intra-layer communication link 103 between the space-based data-center 104 and the space-based data-center 102. The fourth path 418 includes a first inter-layer communication link 121 between the LEO satellite 110, a second inter-layer communication link 105 between the GEO satellite 108 and the space-based data-center 104 at the Lagrange L4/L5 point, and a third intra-layer communication link 103 between the space-based data-center 104 and the space-based data-center 102 on the moon. The space-based data-center 106 can be considered part of a storage and relay layer where the space-based data-center 102 can be considered part of a storage layer 202. The inter-layer communication links can be high-speed point-to-point uplinks and either point-to-point or point-to-multiple-points downlinks.

FIG. 4D illustrates ISLs between devices in an access layer, a caching layer 204, and a storage layer 202 according to one embodiment. The ISLs in the access layer may include multiple intra-layer communication links between the LEO satellites 110 and the HAAs 112. The ISLs in the caching layer 204 may include one or more intra-layer communication links 107 between the GEO/MEO satellites 108. The ISLs in the storage layer 202 may include one or more intra-layer communication links 103 space-based data-centers 106 at Lagrange points and the space-based data-center 102 on the moon. The intra-layer communication links can be high-speed point-to-point links between intra-layer stations.

FIG. 4E illustrates a space-based data-center 102 feeding multiple GEO/MEO satellites 108 over multiple inter-layer communication links 105 and a space-based data-center 106 feeding multiple GEO/MEO satellites 108 in the caching layer 204 over multiple inter-layer communication links 105 according to one embodiment. Similarly, each of the multiple GEO/MEO satellites 108 can feed multiple devices in the access layer over multiple inter-layer communication links 109. For example, as illustrated, one GEO/MEO satellite 108 feeds content to a LEO satellite 110 over a first inter-layer communication link 109 and a HAA 112 over a second inter-layer communication link 111. The inter-layer communication links can be high-speed spot-beams on the downlink for inter-layer multiple access.

FIG. 4F illustrates four LEO satellites 110 and two HAAs 112 to provide an access layer to multiple regions, each region having multiple terminal devices 114 according to one embodiment. Each LEO satellite 110 feeds content to multiple terminal devices in a spot beam over a P2MP link. Similarly, each HAA 112 can feed content to multiple terminal devices 114. Some of the terminal devices 114, serviced by an HAA 112, may be within a spot beam of one LEO satellite 110 and other terminal devices 114, serviced by the HAA 112, may be within a different spot beam corresponding to another one of the LEO satellites 110, as illustrated in FIG. 4F. The HAAs 112 can be used to supplement coverage by the LEO satellites 110, such as between regions covered by the LEO satellites 110. The HAAs 112 may also provide additional computing and storage resources to the access layer, as well as feed content items up to the caching layer 204. In the access layer, the devices may use massive phase arrays for downlink multiple access for the terminal devices 114.

FIG. 4G illustrates an access layer comprising multiple LEO satellites 110 and multiple HAAs 112 and ground stations 118 to feed content into the access layer according to one embodiment. In this embodiment, only some of the LEO satellites 110 may establish inter-layer communication links 117 with the ground station 118. Similarly, only some of the HAAs 112 may establish inter-layer communication links 117 with the ground stations 118. The LEO satellites 110 and HAAs 112 can distribute or relay content items within the access layer over ISLs between the LEO vehicles (110, 112). For example, a LEO satellite 110 that is fed content from the ground station 118 over the inter-layer communication link 117 can relay content to another LEO satellite 110 over an intra-layer communication link 113. Similarly, an HAA 112 that is fed content from the ground station 118 can relay content to a LEO satellite 110 over an intra-layer communication link 113. The ground station 118 may be a low-latency earth ground station that can be used for delay-sensitive applications, such as voice and video call data.

Embodiments of the satellite-based CDNs described herein may provide an expected data rates at approximately 27 GHz with RF technologies and round-trip delays between each element. It should be noted that various satellite communication systems can operate in various bands, such as the $K_u$ band (e.g., 12-18 GHz). For some satellite communications, 10-12 GHz frequencies may be used, as well as 28 GHz, 37 GHz, as well as other frequencies up to approximately 40 GHz. In some embodiments, wireless optical links could be used for layers above the GEO satellites. Terrabit uplink capacity has been demonstrated over free-space optical (FSO) communications similar to the link condition between the Earth ground and the GEO. The main challenge is the need for the system to constantly monitor and adjust to the atmospheric conditions. FSO can be a good choice of the communication links between the elements in and above the caching layer 204 in the outer space where there is no atmosphere. The following table, Table 1, includes multiple parameters for the HAA stations, LEO stations, MEO stations, GEO stations, Lagrange point (L1) stations, and Lunar space-based data-centers.

TABLE 1

| Parameter | | HAA | LEO | MEO | GEO | Lagrange point (L1) | Lunar |
|---|---|---|---|---|---|---|---|
| Round Trip Time [msec] | | 0.13 | 1.3~13.3 | 135 | 240 | 2180 | 2560 |
| Total peak data rate [Tbps] | | >1/HAA | 0.02/sat | <1/sat | >1/sat | >1/sat | >10 |
| Free Space Path Loss @ 27 GHz | to Earth | 147 | 181 | | 212 | 231 | 233 |
| | to HAA | | 181 | | 212 | 231 | 233 |
| | to LEO | 181 | | | 212 | 231 | 233 |
| | to MEO | | | | | | |
| | to GEO | 212 | 212 | | | 230 | 232 |
| | to L1 | | 231 | | 230 | | 216 |
| | to Lunar | 233 | 233 | | 232 | 216 | |
| Estimated power requirement | | 2.5 MW | 1 KW | 10 KW | 20 KW | ~250 kW | >250 MW |

The access layer is responsible for delivering content items to the end users at the terminal devices. The access layer performs end-to-end packet routing, Quality of Service (QoS), and handles service requests to separate real-time services from background and streaming. The access layer manages interference between multiple spot-beams and supports multiple accesses through the use of CDMA and TDMA. The access layer shall use LEO satellites and HAA for better latencies as opposed to GEOs/MEOs, which are used in the caching layer 204. HAA, with its ability to carry payload much heavier than the LEO satellites, opens up the possibility for it to play multiple roles within the system supporting caching, access, uplink data relay, etc. HAA is also well-suited to augment the services in the dense areas such as metropolitans, where LEOs have a hard time fulfilling the demand.

The architecture defines the following types of ground components: the terminal devices, the ground gateway station, the uplink feeding station and the system control. The system control consists of the typical elements required to manage the satellite system: Network Operation Center (NOC), Operational Support Network (OSN), and Telemetry, Tracking and Commands (TTC). In additional to that, a universal content delivery (UCD) system that can seamlessly integrate the content look up within the system and on the Earth's ground is needed to manage the caching and delivery. UCD should also manage the dynamic content replenishment for the fleet of LEO satellites in the access layer. Such replenishment is required to keep the content relevant to the connected devices due to the movement of the LEO satellites. Terminal devices represent all end user devices (handheld, VSAT, fixed, etc.). Gateway station is similar to the gateway station in satellite communication system. During a voice call, it acts like a switching center connecting terminal devices to the PSTN or other switching facilities. For packet data services, it acts like a gateway server connecting to the Internet. FIGS. 5A-5B illustrate how a gateway station is used for data and voice service in the satellite network. In particular, FIG. 5A illustrates a flow for a circuit-switched voice call through a gateway station of a satellite network according to one embodiment. FIG. 5B illustrates a flow for a data call through a gateway station of a satellite network according to one embodiment.

The ground feeding station is an uplink only station for data upload. The feeding station is unique to the proposed architecture. The uplink feeding station uploads data to the caching layer 204 either by directly talking to nearest GEO/MEO satellite or through the HAA which relay the data up to the nearest GEO/MEO satellite. Communication with the feeding station from the access layer may only be supported by the HAA, as LEO satellites may not have enough throughput for these communications.

Figure 6:
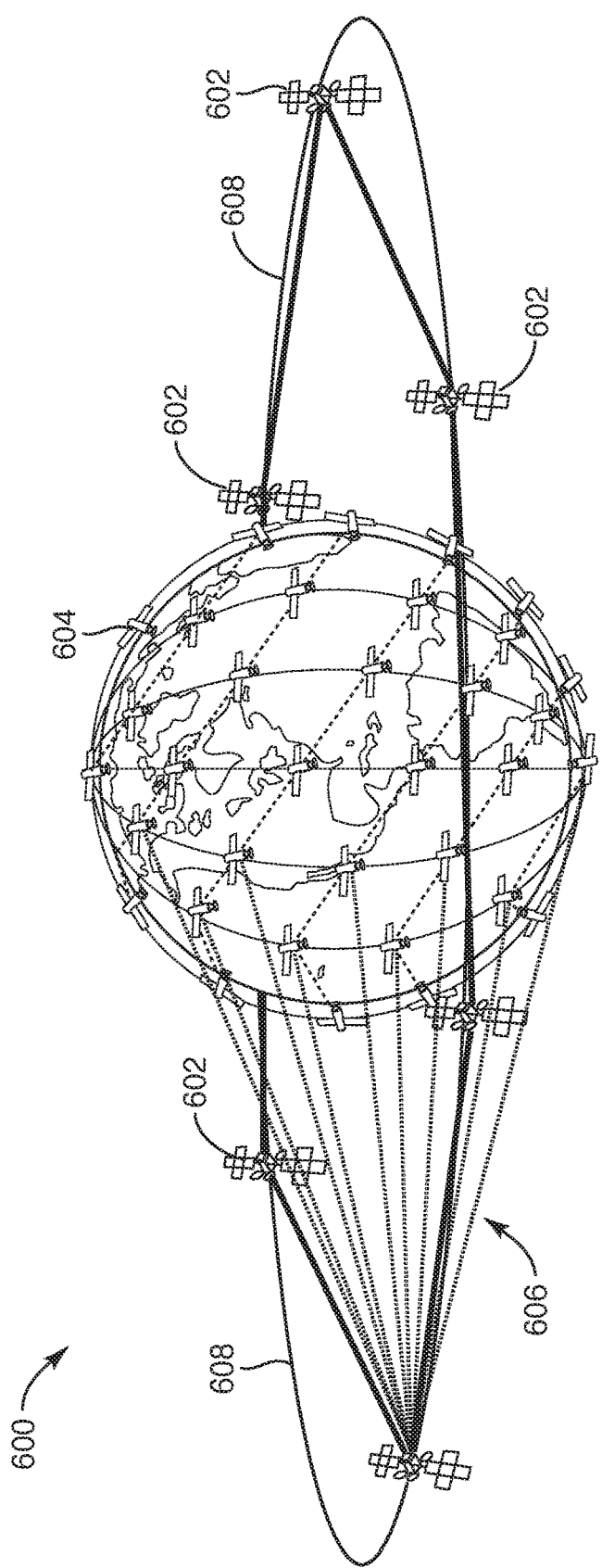
FIG. 6 illustrates a satellite-based CDN with six GEO satellites in a caching layer and sixty-six LEO satellites in an access layer according to one embodiment.

FIG. 6 illustrates a satellite-based CDN 600 with six GEO satellites 602 in a caching layer 204 and sixty-six LEO satellites 604 in an access layer according to one embodiment. Each of the six GEO satellites 602 serves eleven of the sixty-six LEO satellites 604 in the access layer using inter-layer communication links 606. The GEO satellites 602 can communicate with one another using intra-layer communication links 608 (e.g., ISLs). The LEO satellites 604 travel fast across the Earth's surface. For example, the LEO satellites 604 operate at 780 km orbital altitude at 26,804 km/hr. As a LEO satellite 604 moves, it is often needed to route the data to the upcoming neighboring satellite so that the content can stay relevant to users which stays relatively stationary to the Earth ground. Since the data/content items are designed to be cached at the GEO/MEO satellites 602 in the caching layer 204, the access layer data routing across the LEO ISLs can be reduced as the serving GEO/MEO satellite 602 can provide the data to the upcoming LEO satellite 604. Since GEO satellites 602 may not cover the Polar Regions, LEO satellites 604 in the Polar Regions may not be served by the caching layer 204 but can have communications with the neighboring LEO satellites through ISLs.

The satellite-based CDN 600 can perform content caching. Edge caching and edge computing are to be performed by the GEO/MEO satellites. According to study, content items are highly regional and localized. In this regard, MEO satellite is a relatively low value proposition as GEO satellites can serve the purpose of caching better with their geostationary property. Content items can be quickly routed to another MEO or GEO satellite using the ISLs in the caching layer 204 to make MEO satellites a viable solution for caching if geostationary positions for the GEO satellites proven to be hard to obtain. While the edge caching and computing are expected to be mainly performed in the GEO satellites, the access layer should also perform caching whenever applicable but with much smaller storage capacity. In one embodiment, the edge caching services can be a cloud service, such as the Amazon CloudFront service. The edge caching services can be implemented in the caching entities such as GEO/MEO satellites 602, and L4/L5 space stations (not illustrated in FIG. 6). Alternatively, other streaming technologies may be used. It should be noted that the storage and computing resources can vary, but the payloads on the LEO and MEO satellites may be smaller than payloads of a GEO satellite. As such, the LEO and MEO satellites may have less storage and computing resources than a GEO satellite. A HAA, however, as compared to a LEO satellite, may carry more computing and storage resources and can also accommodate higher data rates on the wireless links. In some embodiments, however, the data center stations in GEO may be deployed in LEO but the storage and computing resources may be limited based on size and weight.

Figure 7:
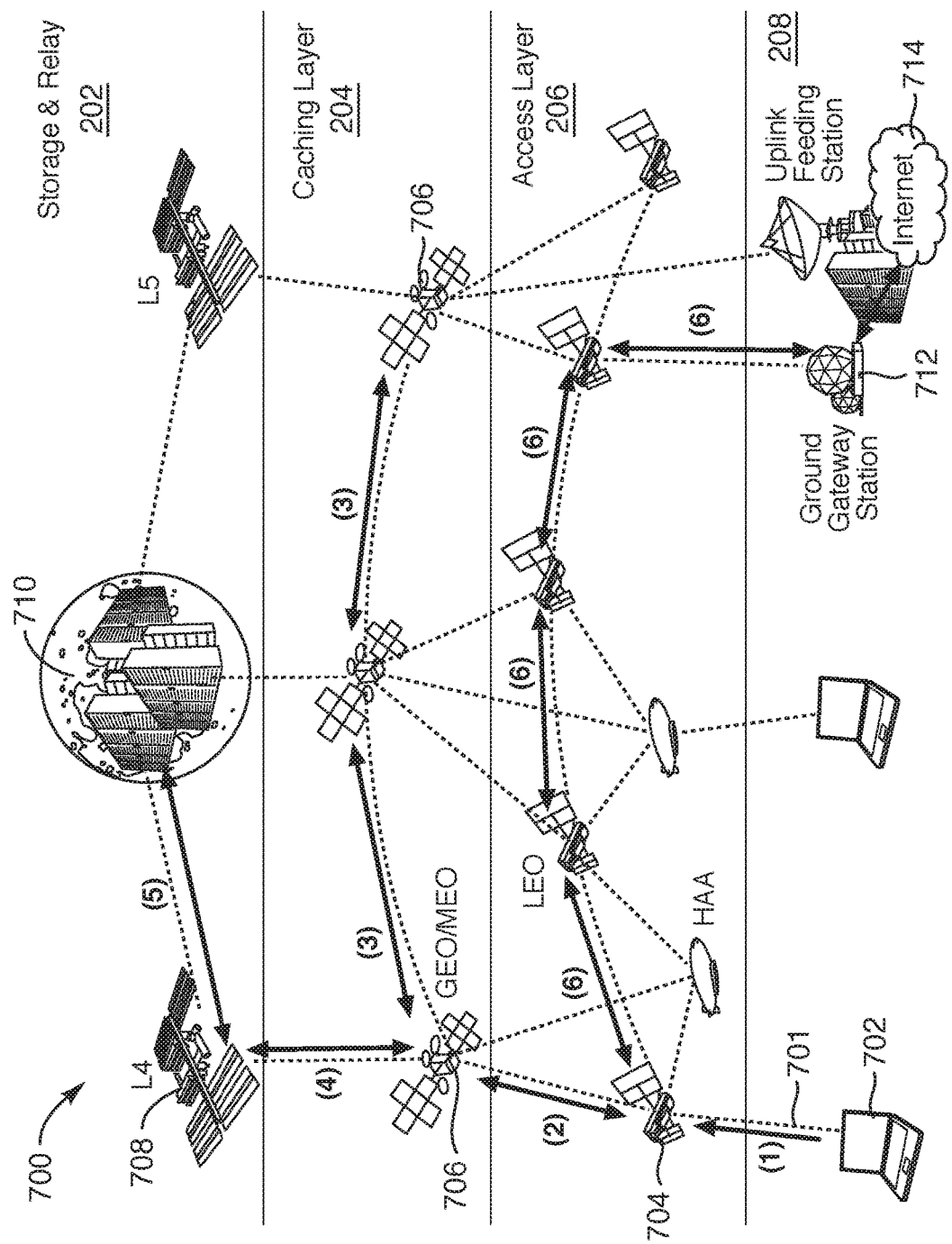
FIG. 7 illustrates how content requests are routed in a satellite-based CDN according to one embodiment.

FIG. 7 illustrates how content requests are routed in a satellite-based CDN 700 according to one embodiment. When a content item is requested by a terminal device 702 on the earth ground layer 208 using a content request 701, a serving access node 704 (e.g., a LEO satellite) first inspects its own cache (onboard storage of the serving access node 704) for content item availability. If the content item is missing at the serving access node 704, the serving access node 704 routes the content request 701 to a serving GEO satellite 706 in the caching layer 204. This may be analogous to a level 1 cache miss in a central processor unit (CPU) architecture. Through the serving GEO satellite 706, if the content item still cannot be found, the content request 701 is sent from the serving GEO satellite 706 to its peers using the ISLs. If the content item cannot be found within the caching layer 204 (analogous to a level 2 cache miss in the CPU architecture), the content request 701 is then forwarded to the L4/L5 storage and relay stations 708 or a lunar data center 710 for final lookup. If the content item is still not found, the content item can be fetched by the serving access node 704 from a ground station 712, directly or through intervening access nodes in the access layer 206. The content item is then cached by the proper caching entity, such as the serving access node 704, the GEO satellite 706, or both.

The penalty for the Level 2 cache miss may be a minimum of 2-3 seconds of round trip from the GEO satellite 706 in the caching layer 204 to the lunar data center 710 and back. If L4/L5 storage and relay stations 708 is queried first and missed, the latency can be even worse. In one embodiment, to reduce the prolonged latency caused by Level 2 cache miss, a catalog of the storage layer 202 can be created by either in the caching layer 204 or in the gateway station to assist the storage layer 202 content searching.

In short the content fetching can follow the following pattern: 1) Terminal devices sends a content request, 2) upon cache missing in LEO, the LEO satellite forwards the content request to the caching layer 204, 3) upon cache missing in GEO, the GEO satellite forwards request to peers through ISLs, 4) Upon peer cache miss in the caching layer 204, the GEO satellite forwards the content request to a L4/L5 storage and relay station, 5) upon cache miss in the L4/L5 station, the L4/L5 station forwards the content request to the lunar data center 710, 6) when the lunar data center 610 does not have the data, the LEO satellite (or other intervening devices) forwards the content request to the gateway ground station 712, and 7) the gateway ground station 712 fetches data from the Internet 714.

During the data caching process, if Level 1 cache in the access layer 206 is full, outdated data should be pushed into the Level 2 cache in the caching layer 204. Also, when the LEO satellites depart from the serving area, the Level 1 cache should be either passed on to the succeeding satellite or the serving GEO caching satellite depending on the LEO's ISL bandwidth.

In some embodiments, the HAAs play important roles both in the access layer 206 and caching layer 204. Albeit limited in coverage, it offers many advantages over LEO satellites such as, for examples, 1) Easy to update/upgrade the communication equipment; 2) Ability to carry over 1,000 kg load; 3) Large surface area for self-sustaining solar cell power source; 4) Enough space for very high gain phased array antennas for both uplink and downlink; and 5) Ability to support dense population with very high data rate.

The fact that HAA can store large amounts of data while providing high throughput both to the ground and toward the sky makes it a perfect relay for the uplink feeding station or even a standalone feeding station by itself. An uplink feeding station is designed to populate the caching layer 204 with the popular content based on the content caching strategy. Frequent content update is expected for the caching layer 204. It is envisioned that a fleet of HAAs should operate in the sky, 24/7 none-stop, above the major metropolitan areas where dense population is expected.

Figure 8:
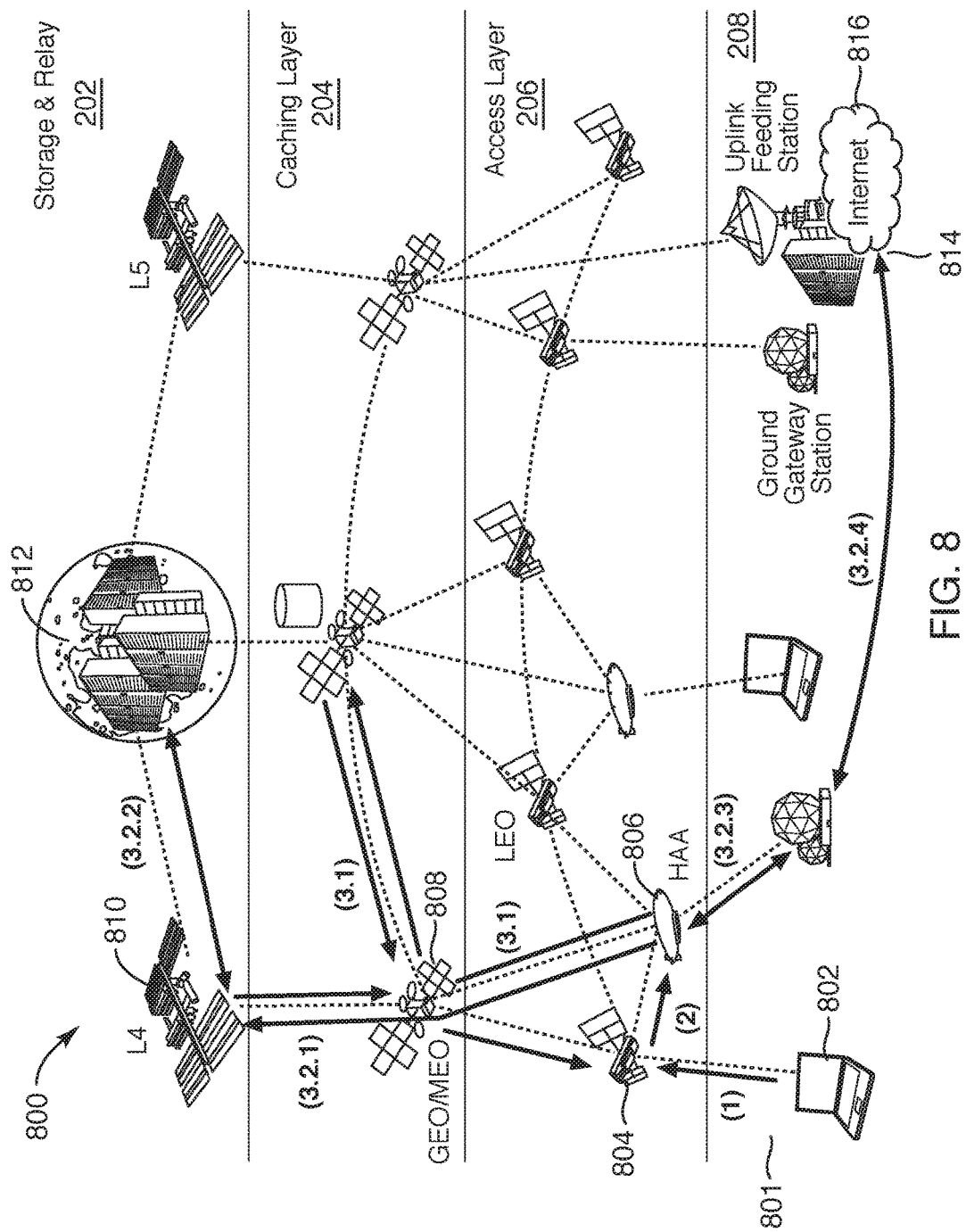
FIG. 8 illustrates how content requests are routed in a satellite-based CDN according to another embodiment.

FIG. 8 illustrates how content requests are routed in a satellite-based CDN 800 according to another embodiment. When a content item is requested by a terminal device 802 on the earth ground layer 208 using a content request 801, a serving access node 804 (e.g., a LEO satellite) first inspects its own cache (onboard storage of the serving access node 804) for content item availability. That is the terminal device 802 sends a content request 801 to a serving access node 804 (e.g., LEO satellite). If the content item is not cached in the serving access node 804, the serving access node 804 forwards the content request 701 to an HAA 806 for route lookup. The HAA 806 can forward at 3.1) the content request to a GEO satellite 808 to see if it is holding the data. At 3.2.1) if content item is not cached in the caching layer 204, the GEO satellite 808 forwards the content request to the storage layer 202. If the content item is not cached in the L4/L5 Lagrange station 810, the L4/L5 Lagrange station 810 3.2.2) forwards the content request to a lunar data center 812. If the content item is not cached in the L4/L5 Lagrange station 810 or the lunar data center 812, the GEO satellite 808 at 3.2.3) forwards the content request to a Gateway 814. The gateway 814 at 3.2.4) fetches data from Internet 816.

It should be noted that in some content access scenarios when the Internet content request from the terminal device reaches the HAA, it may be served similar to the case of the LEO satellite except that cache miss should happen much less at HAA. With high processing power and storage capability, HAA should also serve as a "DNS" server holding the content catalog of the caching layer 204 to help the LEO satellites, reducing the routing delay by providing information of the shortest path to the content. It can also serve as the computing center for predictive caching and caching strategies. FIG. 19 shows an example of how content catalog held at the HAA can help reduce the routing traffic and latency. Similar content catalog can also be stored at the GEO satellite if there is enough storage space.

In the following section, how data generated on the Earth can be fed into the system and eventually stored in the data storage layer 202 is described. The storage layer 202 may be an optional layer, as described herein. The storage layer 202 may have to types of components: the unmanned data centers on the moon and the relay stations at Earth-Moon Lagrange points L4 and L5. The difference between data storage and caching station are the data storage capacity (>1000 Petabyte) and the round-trip delay (>2 sec). The lunar data centers may have the largest data storage within the whole system excluding the Earth stations. The abundant solar energy, the very thin layer of atmosphere, and the gravity that's only ⅙ of the Earth make moon a perfect base for building out the space stations on L4 and L5. These space stations are built to support data store-and-forwarding when there is no direct communication available between the GEO satellites and the lunar data centers. Unfortunately, if data were to be routed through these space stations, the latency could double. Hence this may only be suitable for streaming video where customer's tolerance for the initial content delay is high.

The following table, Table 2, includes the estimated parameters, such as data storage capacity, round-trip delay between different elements in the system and the Earth data center, total peak data rates, and the storage technology that can be used for the particular device.

TABLE 2

| Parameter | HAA | LEO | MEO | GEO | L1 | L4/L5 | Lunar | Data center |
|---|---|---|---|---|---|---|---|---|
| Round Trip Time [msec] | 0.13 | 1.3~13.3 | 135 | 240 | 2180 | 5120 | 2560 | n/a |
| Total peak data rate [Tbps] | >1/HAA | 0.02/sat | <1/sat | >1/sat | >1/station | >1/station | >10 | 25-100 |
| Data storage [PB] | ~1,000 | ~0.1 | ~10 | ~100 | ~1,000 | ~1,000 | >1,000,000 | n/a |
| Storage Tech | SSD | SSD | SSD | SSD | SSD | SSD | SSD + Optics | n/a |

In the architecture, ultra-high-speed links are projected between GEO satellites and lunar space-based data-centers. The Moon offers large area for multiple massive data centers with very high gain antennas to provide high throughput connectivity on the downlink to the GEO caching layer 204, and potentially to LEO satellites, HAAs, and Earth-bound data centers directly, such as AWS data centers. The challenges for high speed direct links between the layers below the GEO caching and the Luna are the Earth atmospheric disturbance, which may create a bottleneck for FSO technologies. Due to regulatory agreements, there may be limited available RF frequency bands.

In one embodiment, the satellite-based CDN can be deployed in two phases. The first phase could be the construction of the access layer 206 and the caching layer 204 that are attainable with the current technologies and with less funding. The second phase, which may be longer term, may start with the efforts to colonize the lunar surface with the advanced manufacturing technologies such as 3D printing, robotics, virtual reality, renewable energy (e.g., solar energy), etc. The second phase seeks to build the necessary infrastructure, such as the solar energy plant, mining and processing facility, communication infrastructure, etc., to support the unmanned operation of the data centers and also to function as the possible springboard for constructing and launching the L4/L5 Lagrange space stations from the lunar surface. The space station should be equipped with the long distance, high-throughput communication links, and large amount of high-density storage devices. Whether it makes sense technology-wise and financially to build and launch the space stations from the Luna or the Earth depends on the availability and maturity of the technologies. Some of these enabling technologies may include 1) phase array antennas for massive beam forming; 2) optical storage with high density and capable of sustaining the operation in the space environment; 3) smart routing protocol for data upload and download from the ground station; 4) very high bandwidth optical wireless communication links between GEO, Lagrange and Lunar station; 5) AWS data center capabilities (Lambda, elastic search, cloud front, Astra, etc.); 6) Amazon Instant Video (AIV) content processing; 7) edge caching and computing; 8) 3D printing; 9) unmanned and autonomous manufacturing; 10) Quantum Cryptography; and the like.

For the 1) phase array antenna for massive beam forming, the two main ingredients for the access layer 206 to be able to serve different content to multiple users are the space division multiple access (SDMA), CDMA and TDMA. Massive antenna arrays in the order of hundreds or even thousands of elements that can create as many beams as possible at very narrow beam widths can allow the system to serve different content for users from different beams. Users are further separated by TDMA within the same beam. The system design can be designed to group users into different broadcast and/or multi-cast categories and properly use the right mix of SDMA and TDMA to achieve maximum capacity. The required data rates for each beam and the desired beam width can be selected accordingly. Similar phase array antennas may be needed for the GEO/MEO in the caching layer 204 as well. Free space optical can also be considered for ISLs between the GEO/MEO satellites.

The table, Table 3 provided below, shows the link budget (which do not account for the fading margin and atmospheric attenuation factors) calculations between the different stations. Antenna sizes listed in the table below specifies a size required to provide sufficiently good link (by controlling the antenna gain) to enable the best data rate supported by the two stations.

TABLE 3

| Satellite to Earth Link *Earth = AWS Data Center | | | | | |
|---|---|---|---|---|---|
| From (TX) | To (RX) | FSPL (dB) | Dist. (m) | RTT (msec) | Freq. (Hz) |
| HAA | Earth | 147.09 | 2.00E+04 | 6.67E−02 | 2.70E+10 |
| LEO | Earth | 181.07 | 1.00E+06 | 3.33E+00 | 2.70E+10 |
| MEO | Earth | 207.17 | 2.02E+07 | 6.73E+01 | 2.70E+10 |
| GEO | Earth | 212.14 | 3.58E+07 | 1.19E+02 | 2.70E+10 |
| L1 | Earth | 231.34 | 3.26E+08 | 1.09E+03 | 2.70E+10 |
| Lunar | Earth | 232.75 | 3.84E+08 | 1.28E+03 | 2.70E+10 |

| TX + RX Ant Gain (dBi) | TX Power (dBm) | TX Ant Gain (dBi) | RX Power (dBm) | RX Ant Gain (dBi) | TX Ant.Size (dia.) | RX Ant.Size (dia.) |
|---|---|---|---|---|---|---|
| 83.00 | 25 | 35.50 | −39.09 | 47.50 | 0.25 m | 1 m |
| 95.00 | 45 | 47.50 | −41.07 | 47.50 | 1 m | 1 m |
| 101.00 | 45 | 53.50 | −61.17 | 47.50 | 2 m | 1 m |

TABLE 3-continued

| Satellite to Earth Link *Earth = AWS Data Center | | | | | |
|---|---|---|---|---|---|
| 107.00 | 50 | 59.50 | −55.14 | 47.50 | 4 m | 1 m |
| 107.00 | 50 | 59.50 | −74.34 | 47.50 | 4 m | 1 m |
| 135.00 | 50 | 87.50 | −47.75 | 47.50 | 100 m | 1 m |

For the 2) optical storage, data storage devices in the outer space must be able to sustain strong radiation from the Sun. Optical storage with high density and capable of sustaining the operation in the extraterrestrial environment may be a good choice for this requirement. Optical storage device, in early 2016 (or late 2015) from many journals, had a breakthrough in the technology development—the 5D optical storage system. The reported storage capacity in a CD using the new technology was 360 TB. In addition to the new record storage level, the data can be preserved for many billion years. The storage medium (glass) is also easy to construct by heating ordinary sand (silicon dioxide) easily found on Earth and the moon. In 2008, the International Data Corporation found that total capacity of data stored is increasing by around 60% each year. As a result, more than 39,000 exabytes of data may be generated by 2020. This amount of data may cause a series of problems and one of the main problems may be power consumption. 1.5% of the total U.S. electricity consumption in 2010 was given to the data centers in the U.S. According to a report by the Natural Resources Defence Council, the power consumption of all data centers in the U.S. would reach roughly 140 billion kilowatt-hours per each year by 2020. This amount of electricity is equivalent to that generated by roughly thirteen Heysham 2 nuclear power stations (one of the biggest stations in UK, net 1240 MWe).

Most of these data centers are built based on hard-disk drive (HDD), with only a few designed on optical discs. HDD is the most popular solution for digital data storage according to the International Data Corporation. However, HDD is not an energy-efficient option for data archiving; the loading energy consumption is around 0.04 W/GB. In addition, HDD is an unsatisfactory candidate for long-term storage due to the short lifetime of the hardware and requires transferring data every two years to avoid any loss. Efforts are being made to increase the speed of writing and developing a microscope-free read-out drive, similar to the technology for reading conventional CD/DVDs, but with two additional dimensions.

For the 3) smart routing protocol, there are a few distinct kinds of routing protocols necessary to support the hierarchical system: a) the routing of the content from the lunar data centers to the caching layer 204—this is similar to the CDN on the ground; b) the routing between the caching layer 204 and the access layer 206; c) the routing within the access layer 206 through the ISLs; d) the routing within the caching layer 204 through the ISLs; e) the routing between the ground stations through the satellite network; f) the routing between the ground stations and the lunar data centers. Routing protocols 2 and 3 are designed to deal with the content redistribution required to support LEO satellite movements. Routing between the satellites (similar to 3) is widely accepted and implemented in the LEO satellite network today as part of the ISLs. Content items delivered to the access layer 206 from the top layer (caching layer 204 or storage layer 202) and the data received by it from the lower earth ground layer 208 (ground stations) should be either quickly passed on to the neighboring LEO satellites for the data to stay relevant or be transported towards the caching layer 204 that may come in to range.

The network architecture described herein can be used to provide global high-speed Internet service from above the sky through various aircrafts such as high-altitude airships, satellites, space stations, and eventually the lunar data centers. The network architecture utilizes technology advancements in radio frequency (RF) communications and optical wireless communications to provide content delivery over data networks, aviation, data storage, and edge caching. The system of devices in this network architecture achieves the high-speed Internet by sourcing and serving a majority (e.g., 70%) of the data traffic from above the sky, which reduces or eliminates the need to access the band-limited, ground stations on earth. The system of devices is designed to meet the requirements of both delay-sensitive traffic such as interactive services, voice calls, and video calls that consume medium to low data bandwidth, as well as the more delay-tolerant but high bandwidth Internet content such as streaming (e.g., videos) and background services (e.g. email, file transfer protocol (FTP)). In some embodiments, the system of devices is able to support highly time sensitive applications that require near real-time responses, such as professional gaming, in selected areas covered by the high-altitude airships given the increased computing resources that can be deployed on these high-altitude airships. The construction and deployment of the network of devices may be done in two stages: an initial state that relies on current and near-term technology advancements; and a subsequent stage that includes new space technology advancements, such lunar data centers. The new space technology advancements may require a longer-term commitment and additional time for technology breakthroughs in providing lunar data centers.

Figure 9:
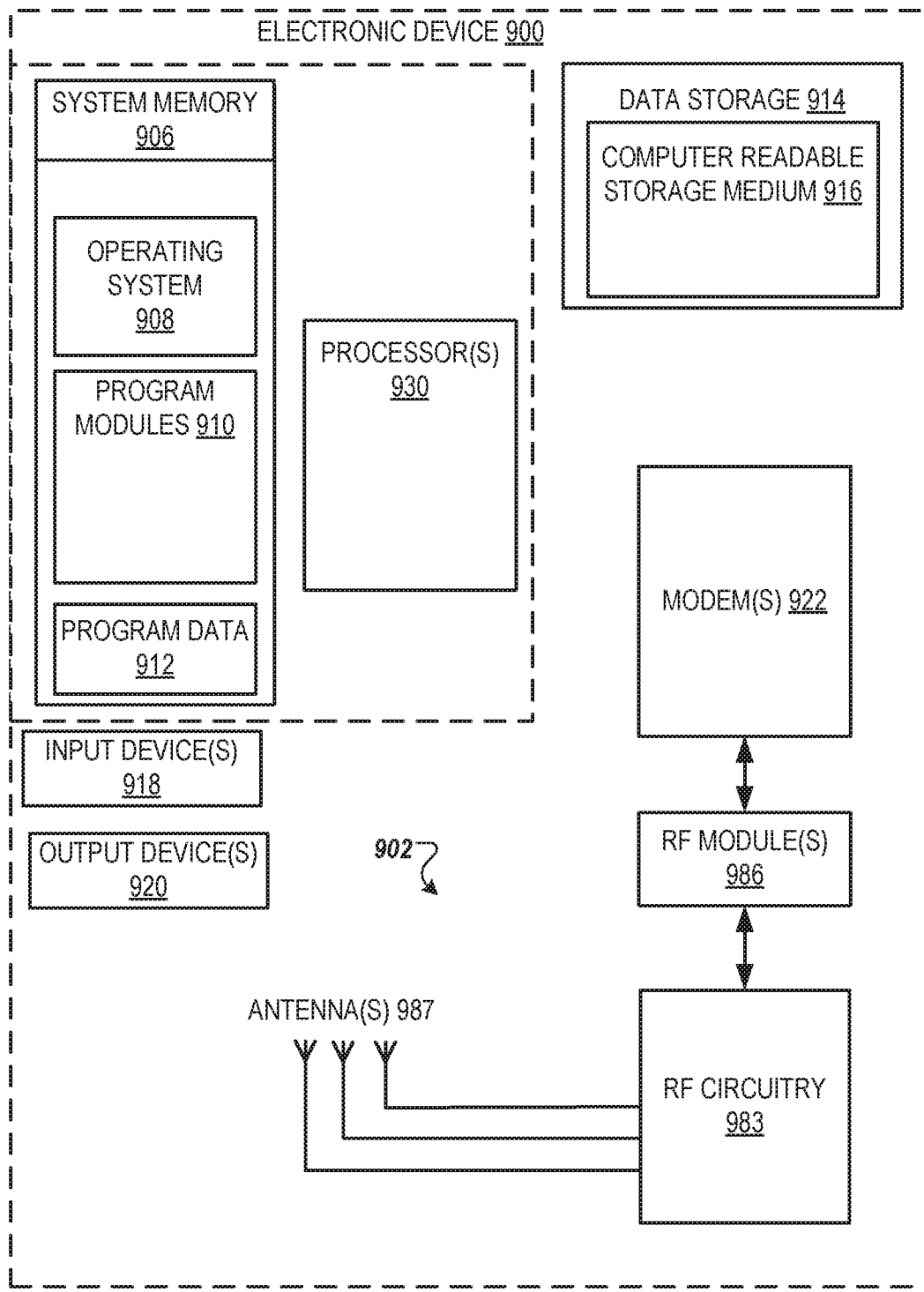
FIG. 9 is a block diagram of an electronic device with a wireless communication subsystem according to one embodiment.

FIG. 9 is a block diagram of an electronic device 900 with a wireless communication subsystem 902 according to one embodiment. The electronic device 900 may be any one of the terminal devices described herein. The electronic device 900 includes one or more processor(s) 930, such as one or more CPUs, microcontrollers, field programmable gate arrays, or other types of processors. The electronic device 900 also includes system memory 906, which may correspond to any combination of volatile and/or non-volatile storage mechanisms. The wireless communication subsystem 902 may include modems 922, RF modules 986, RF circuitry 983, and antenna(s) 987. The system memory 906 stores information that provides operating system component 908, various program modules 910, program data 912, and/or other components. In one embodiment, the system memory 906 stores instructions of methods to control operation of the electronic device 900. The electronic device 900 performs functions by using the processor(s) 930 to execute instructions provided by the system memory 906.

The electronic device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the electronic device 900, the system memory 906, and the processor(s) 930 also constituting computer-readable media. The electronic device 900 may also include one or more input devices 918 (keyboard, mouse device, specialized selection keys, etc.) and one or more output devices 920 (displays, printers, audio output mechanisms, etc.).

The electronic device 900 further includes a modem 922 to allow the electronic device 900 to communicate via a wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, PAN module, GPS module, or the like. The RF modules 986 may be any of the radios described above with respect to FIGS. 3-8. The antenna structures (antenna(s) 984, 985, and 987) are coupled to the RF circuitry 983, which is coupled to the modem 922. The RF circuitry 983 may include radio front-end circuitry, antenna switching circuitry, impedance matching circuitry, or the like. In one embodiment, the RF circuitry 983 includes some of the components described above with respect to the radios as described in the various embodiments of FIGS. 3-8. The antennas 984 may be GPS antennas, NFC antennas, other WAN antennas, WLAN or PAN antennas, or the like. The modem 922 allows the electronic device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, and 987 may be configured to transmit in different frequency bands and/or using different wireless communication protocols. The antennas 984, 985, and 987 may be directional, omnidirectional, or non-directional antennas. In addition to sending data, antennas 984, 985, and 987 may also receive data, which is sent to appropriate RF modules connected to the antennas. One of the antennas 984, 985, 987 may be any combination of the antenna structures described herein.

In one embodiment, the electronic device 900 establishes a first connection using a first wireless communication protocol, and a second connection using a different wireless communication protocol. The first wireless connection and second wireless connection may be active concurrently, for example, if an electronic device is receiving a media item from another electronic device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content delivery within other devices in a network and the second wireless connection may be associated with serving a content file to a client consumption device, as described herein.

Though a modem 922 is shown to control transmission and reception via antenna (984, 985, 987), the electronic device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A geosynchronous equatorial orbit (GEO) satellite in a first orbit, the GEO satellite comprising:
   a storage device;
   a processor coupled to the storage device;
   an intra-satellite wireless interface comprising a first transceiver coupled to the processor, wherein the processor is to establish a first point-to-point (P2P) link between the first transceiver and a second transceiver of a second GEO satellite;
   an uplink wireless interface comprising a third transceiver coupled to the processor, wherein the processor is to establish a second P2P link between the third transceiver and a fourth transceiver of a space-based data-center located in a second orbit that is higher than the first orbit; and
   a downlink wireless interface comprising a fifth transceiver coupled to the processor, wherein the processor is to establish a third wireless link between the fifth transceiver and a sixth transceiver of a first device, wherein the processor is configured to:
      receive a request for a content item from the first device situated in a third orbit that is lower than the first orbit;
      determine that the content item is not available in the storage device and perform one of:
         (i) request the content item from the second GEO satellite via the first P2P link; or
         (ii) request the content item from the space-based data-center via the second P2P link; and
      deliver the content item to the first device via the third wireless link.

2. The GEO satellite of claim 1, wherein the first device is a low earth orbit (LEO) satellite or a high-altitude airship (HAA).

3. The GEO satellite of claim 1, wherein the space-based data-center is a satellite located at a Lagrange point.

4. The GEO satellite of claim 1, wherein the first transceiver is a first optical transceiver, wherein the second transceiver is a second optical transceiver, wherein the third transceiver is a radio frequency (RF) transceiver.

5. The GEO satellite of claim 1, wherein the first transceiver is a first optical transceiver, wherein the second transceiver is a second optical transceiver, wherein the third transceiver is an optical transceiver.

6. The GEO satellite of claim 1, wherein the first transceiver, the second transceiver, and the third transceiver operate at approximately 27 GHz.

7. The GEO satellite of claim 1, wherein the first transceiver, the second transceiver, and the third transceiver operate between approximately 12 GHz and approximately 18 GHz.

8. The GEO satellite of claim 1, wherein the third wireless link is a point-to-multiple-point (P2MP) link.

9. The GEO satellite of claim 1, wherein the first transceiver is to establish a third P2P link between the first transceiver and a seventh transceiver of a medium earth orbit (MEO) satellite, wherein the processor is further to:
   determine that the content item is not available in the storage device and perform one of:
      (i) request the content item from the second GEO satellite via the first P2P link;
      (ii) request the content item from the space-based data center via the second P2P link; or
      (iii) request the content item from the MEO satellite via the third P2P link.

10. The GEO satellite of claim 1, wherein the downlink wireless interface comprises a seventh transceiver coupled to the processor, wherein the processor is to establish a fourth P2P uplink between the seventh transceiver and an eighth transceiver of a high-altitude airship (HAA), wherein the processor is further configured to:
   receive the content item from the HAA via the fourth P2P uplink prior to the request for the content item is received by the processor from the first device.

11. The GEO satellite of claim 1, wherein the downlink wireless interface comprises a seventh transceiver coupled to the processor, wherein the processor is to establish a fourth P2P uplink between the seventh transceiver and an eighth transceiver of a ground station, wherein the processor is further configured to:
   receive the content item from the ground station via the fourth P2P uplink prior to the request for the content item is received by the processor from the first device.

12. A low earth orbit (LEO) vehicle in a first orbit, the LEO vehicle comprising:
   a storage device;
   a processor coupled to the storage device;
   an intra-satellite wireless interface comprising a first transceiver coupled to the processor, wherein the processor is to establish a first point-to-point (P2P) link between the first transceiver and a second transceiver of a second LEO vehicle;
   an uplink wireless interface comprising a third transceiver coupled to the processor, wherein the processor is to establish a second P2P link between the third transceiver and a fourth transceiver of a geosynchronous equatorial orbit (GEO) satellite located in a second orbit higher than the first orbit; and
   a downlink wireless interface comprising a fifth transceiver coupled to the processor, wherein the processor is to establish a third downlink between the fifth transceiver and a sixth transceiver of a terminal device located on earth, wherein the processor is configured to:
      receive a request for a content item from the terminal device;
      determine that the content item is not available in the storage device and perform one of:
         (i) request the content item from the second LEO vehicle via the first P2P link; or
         (ii) request the content item from the GEO satellite via the second P2P link; and
      deliver the content item to the terminal device via the third downlink.

13. The LEO satellite of claim 12, wherein the LEO vehicle is a LEO satellite or a high-altitude airship (HAA).

14. The LEO satellite of claim 12, wherein the first transceiver is a first optical transceiver, wherein the second transceiver is a second optical transceiver, wherein the third transceiver is an optical transceiver.

15. The LEO satellite of claim 12, wherein the first transceiver is a first optical transceiver, wherein the second transceiver is a second optical transceiver, wherein the third transceiver is a radio frequency (RF) transceiver.

16. The LEO satellite of claim 15, wherein the downlink wireless interface further comprises a seventh transceiver coupled to the processor, wherein the processor is to establish a fourth P2P uplink between the seventh transceiver and an eighth transceiver of a ground station, wherein the processor is further configured to:
   receive data associated with a voice or video call from the ground station via the fourth P2P uplink; and
   deliver the data associated with the voice or video call to the terminal device via the third downlink or to the second LEO vehicle via the first P2P link.

17. The LEO satellite of claim 12, wherein the third downlink is a point-to-point (P2P) link.

18. The LEO satellite of claim 12, wherein the third downlink is a point-to-multipoint (P2MP) link.

19. A satellite in a first orbit, satellite comprising:
   a storage device;
   a processor coupled to the storage device;
   a first transceiver coupled to the processor, wherein the processor is to establish a first point-to-point (P2P) link between the first transceiver and a second transceiver of a second device in the first orbit;
   a third transceiver coupled to the processor, wherein the processor is to establish a second P2P link between the third transceiver and a fourth transceiver of a third device in a second orbit that is higher than the first orbit; and
   a fifth transceiver coupled to the processor, wherein the processor is to establish at least one of a third P2P link between the fifth transceiver and a sixth transceiver of a terminal device located on earth or a point-to-multipoint (P2MP) link between the fifth transceiver and transceivers of at least two terminal devices located on earth, wherein the processor is configured to:
   receive a request for a content item;
   determine that the content item is not available in the storage device and perform one of:
     (iii) request the content item from the second device via the first P2P link; or
     (iv) request the content item from the third device via the second P2P link; and
   transmit the content item via at least one of the third P2P link or the P2MP link.

20. The satellite of claim 19, further comprising seventh transceiver coupled to the processor, wherein the processor is to establish a fourth P2P uplink between the seventh transceiver and an eighth transceiver of a ground station, wherein the processor is further configured to:
   receive data associated with a voice or video call from the ground station via the fourth P2P uplink; and
   deliver the data associated with the voice or video call to the terminal device via the third P2P link or to the second device via the first P2P link.

* * * * *